(12) United States Patent
Gagnon

(10) Patent No.: US 9,731,599 B2
(45) Date of Patent: Aug. 15, 2017

(54) ELECTRIC OFF-ROAD WHEELED VEHICLE

(71) Applicant: CONSORTIUM DE RECHERCHE BRP—UNIVERSITE DE SHERBROOKE S.E.N.C., Sherbrooke (CA)

(72) Inventor: Marc Gagnon, Austin (CA)

(73) Assignee: CONSORTIUM DE RECHERCHE BRP—UNIVERSITE DE SHERBROOKE S.E.N.C., Sherbrooke (CA)

( * ) Notice: Subject to any disclaimer, the term of this patent is extended or adjusted under 35 U.S.C. 154(b) by 143 days.

(21) Appl. No.: 14/636,519

(22) Filed: Mar. 3, 2015

(65) Prior Publication Data

US 2015/0165900 A1    Jun. 18, 2015

Related U.S. Application Data

(62) Division of application No. 14/131,526, filed as application No. PCT/CA2012/000651 on Jul. 5, 2012, now Pat. No. 8,973,691.

(Continued)

(51) Int. Cl.
| | |
|---|---|
| B60L 3/08 | (2006.01) |
| B60L 15/10 | (2006.01) |
| B60L 15/20 | (2006.01) |
| B60K 17/356 | (2006.01) |
| B60K 1/00 | (2006.01) |
| B60K 1/04 | (2006.01) |
| B60L 11/18 | (2006.01) |
| B60K 17/344 | (2006.01) |

(Continued)

(52) U.S. Cl.
CPC ............. *B60K 17/356* (2013.01); *B60K 1/00* (2013.01); *B60K 1/04* (2013.01); *B60K 17/344* (2013.01); *B60K 20/08* (2013.01); *B60K 23/08* (2013.01); *B60L 11/18* (2013.01); *B60R 21/13* (2013.01); *B60T 1/062* (2013.01); *B62D 63/02* (2013.01); *B60K 11/06* (2013.01); *B60K 17/22* (2013.01); *B60K 2001/001* (2013.01); *B60K 2001/006* (2013.01); *B60K 2001/0411* (2013.01); *B60K 2001/0416* (2013.01); *B60K 2001/0422* (2013.01); *B60K 2023/0858* (2013.01); *B60L 2200/22* (2013.01); *B60L 2220/42* (2013.01); *B60Y 2200/124* (2013.01); *B60Y 2400/61* (2013.01); *Y02T 10/648* (2013.01); *Y02T 10/7005* (2013.01)

(58) Field of Classification Search
CPC .. B60L 3/08; B60L 15/10; B60L 15/20; B60L 2200/22
See application file for complete search history.

(56) References Cited

U.S. PATENT DOCUMENTS 3,818,293 A * 6/1974 Wood ................. B60L 11/1805
                                                      180/65.1
4,697,660 A    10/1987 Wu et al.
(Continued)

FOREIGN PATENT DOCUMENTS

WO    2009096973 A1    8/2009
WO    2009096977 A1    8/2009

*Primary Examiner* — Bryan Evans
(74) *Attorney, Agent, or Firm* — BCF LLP

(57) ABSTRACT

An off-road vehicle has four wheels and side-by-side driver and passenger seats. At least two of the wheels are driven by an electric motor powered by batteries disposed in the vehicle.

16 Claims, 29 Drawing Sheets

Related U.S. Application Data

(60) Provisional application No. 61/505,608, filed on Jul. 8, 2011.

(51) Int. Cl.
 *B60K 20/08* (2006.01)
 *B60K 23/08* (2006.01)
 *B60T 1/06* (2006.01)
 *B62D 63/02* (2006.01)
 *B60R 21/13* (2006.01)
 *B60K 11/06* (2006.01)
 *B60K 17/22* (2006.01)

(56) References Cited

U.S. PATENT DOCUMENTS

| | | |
|---|---|---|
| 6,001,041 A | 12/1999 | Sawase et al. |
| 7,468,562 B1 | 12/2008 | Barbic |
| 7,815,009 B1 * | 10/2010 | Speelman, Jr. ........ B60K 20/04 180/315 |
| 7,854,282 B2 | 12/2010 | Lee et al. |
| 7,967,100 B2 | 6/2011 | Cover et al. |
| 8,079,602 B2 | 12/2011 | Kinsman et al. |
| 8,302,724 B2 | 11/2012 | Gillingham et al. |
| 9,358,882 B2 | 6/2016 | Hapka |
| 2007/0267243 A1 * | 11/2007 | Bell ................. H01H 27/06 180/336 |
| 2008/0121443 A1 * | 5/2008 | Clark ................. B60L 3/108 180/65.1 |
| 2008/0169675 A1 * | 7/2008 | Hebert ............... F16L 3/1222 296/187.01 |
| 2009/0112383 A1 * | 4/2009 | Lenart ................ B60L 7/24 701/22 |
| 2009/0145674 A1 | 6/2009 | Lee et al. |
| 2009/0301830 A1 | 12/2009 | Kinsman et al. |
| 2010/0317484 A1 | 12/2010 | Gillingham et al. |

\* cited by examiner

ELECTRIC OFF-ROAD WHEELED VEHICLE

CROSS-REFERENCE

The present application is a division of U.S. patent application Ser. No. 14/131,526, filed Jan. 8, 2014, which is a 371 of International Patent Application No. PCT/CA2012/000651, filed Jul. 5, 2012, which claims benefit of U.S. Provisional Patent Application No. 61/505,608, filed Jul. 8, 2011, the entirety of all of which is incorporated herein by reference.

TECHNICAL FIELD

The present invention relates generally to electric off-road wheeled vehicles.

BACKGROUND

Recreational utility vehicles (RUVs) generally have an open cockpit area with side-by-side seating. They are often referred to as side-by-side All-Terrain Vehicles (ATVs).

The open cockpit area is protected by a roll cage disposed above the cockpit area. The driver and the passenger enter and exit (ingress and egress) the vehicle through lateral passages, as is traditionally done on automobiles.

As is the case of most off-road vehicles, RUVs are typically powered by an internal combustion engine. Therefore, these RUVs typically consume petroleum based fuels and emit exhaust gases such as carbon dioxide and nitrous oxides. These gases are known to contribute to the greenhouse effect.

In recent years, the efficiency of internal combustion engines has improved resulting in less fuel consumption and lower emissions of greenhouse gases.

It is also possible to completely eliminate fuel consumption and greenhouse gas emissions by replacing the internal combustion engine by an electric motor. An increased number of automobiles are now powered by one or more electric motors.

However, the systems developed for the automobile industry cannot be directly applied to RUVs. RUVs are designed to operate off-road, which means that they are more exposed to dirt, mud, and water than automobiles. The vehicle layout of an RUV is also different than that of an automobile. Finally, the performance and operating expectations of owners of RUVs differ from those of an automobile. Owners of electric automobiles typically give a lot of importance to the vehicle's efficiency in order to have the maximum range of operation and give less importance to factors such as maximum speed, handling and acceleration. Although vehicle range would also likely be of concern to owners of electric RUVs, they also have high expectations regarding aspects such as maximum speed, handling and acceleration. In other words, an electric RUV should be true to its "recreational" nature.

Therefore, there is a need for an RUV powered by an electric motor.

SUMMARY

It is an object of the present to provide an electric off-road vehicle.

In one aspect, the present provides an off-road vehicle having a frame, at least one seat mounted on the frame, an electric motor supported by the frame, at least one battery electrically connected to the electric motor and two front wheels and two rear wheels supported by the frame. At least two of the wheels are operatively connected to the electric motor for propelling the vehicle. A steering device is operatively connected to at least two of the wheels for steering the vehicle. A motor control module is electrically connected to the electric motor for controlling an operation of the electric motor. A vehicle control module is electrically connected to the motor control module for controlling an operation of the motor control module. A shifter is movably connected to the frame. The shifter is movable to a plurality of discrete positions. A shifter position sensor is operatively connected to the shifter for sensing a position of the shifter. The shifter position sensor is electrically connected to the vehicle control module for transmitting a shifter position signal indicative of the position of the shifter to the vehicle control module. The vehicle control module is adapted for controlling the operation of the motor control module based at least in part on the shifter position signal.

In a further aspect, a cockpit area is defined in the frame and a roll cage is connected to the frame. The roll cage covers at least in part the cockpit area. The at least one seat includes a driver seat and a passenger seat disposed side-by-side in the cockpit area. The shifter is disposed laterally between the driver and passenger seats.

In an additional aspect, the plurality of discrete positions includes a park position. When the shifter position signal indicates that the shifter is in the park position, the vehicle control module is adapted to control the motor control module to cause the electric motor to stop driving the at least two of the wheels being operatively connected to the electric motor.

In a further aspect, a parking brake is operatively connected to at least one of the electric motor and at least one of the wheels. When the shifter position signal indicates that the shifter is in the park position, the vehicle control module is adapted to cause the parking brake to be engaged.

In an additional aspect, when the shifter position signal indicates that the shifter is in a position other than the park position, the vehicle control module is adapted to cause the parking brake to be disengaged.

In a further aspect, the plurality of discrete positions includes a neutral position. When the shifter position signal indicates that the shifter is in the neutral position, the vehicle control module is adapted to control the motor control module to cause the electric motor to stop driving the at least two of the wheels being operatively connected to the electric motor.

In an additional aspect, a front driveshaft is selectively connected to the electric motor to selectively drive the two front wheels, a rear driveshaft is connected to the electric motor to drive the two rear wheels, and a 2WD/4WD selector selectively connects the front driveshaft to the electric motor. When the shifter position signal indicates that the shifter is in the neutral position, the vehicle control module is adapted to cause the 2WD/4WD selector to disconnect the front driveshaft from the electric motor.

In a further aspect, a first rear drive axle is connected to one of the two rear wheels for rotation therewith, a second rear drive axle is connected to a remaining one of the two rear wheels for rotation therewith, and a rear gear assembly operatively connects the first and second rear drive axles to the electric motor. The rear gear assembly selectively connects the first and second rear drive axles together. When the first and second rear drive axles are connected together by the rear gear assembly, the first and second rear drive axles rotate together. When the first and second rear drive axles are disconnected from each other by the rear gear assembly, the first and second rear drive axles rotate independently from each other. When the shifter position signal indicates that the shifter is in the neutral position, the vehicle control module is adapted to cause the rear gear assembly to disconnect the first and second rear drive axles from each other.

In an additional aspect, a first front drive axle is connected to one of the two front wheels for rotation therewith, a second front drive axle is connected to a remaining one of the two front wheels for rotation therewith, and a front gear assembly operatively connects the first and second front drive axles to the electric motor. The front gear assembly selectively connects the first and second front drive axles together. When the first and second front drive axles are connected together by the front gear assembly, the first and second front drive axles rotate together. When the first and second front drive axles are disconnected from each other by the front gear assembly, the first and second front drive axles rotate independently from each other. When the shifter position signal indicates that the shifter is in the neutral position, the vehicle control module is adapted to cause the front gear assembly to disconnect the first and second front drive axles from each other.

In a further aspect, the plurality of discrete positions includes at least one forward position. When the shifter position signal indicates that the shifter is in one of the at least one forward position, the vehicle control module is adapted to control the motor control module to cause the electric motor to turn an output shaft of the electric motor in a first direction. Turning the output shaft in the first direction causes the vehicle to move forward.

In an additional aspect, the at least one forward position includes a high position and a low position. When the shifter position signal indicates that the shifter is in the high position, the vehicle control module is adapted to control the motor control module to control the electric motor to limit a speed of the vehicle to a first vehicle speed. When the shifter position signal indicates that the shifter is in the low position, the vehicle control module is adapted to control the motor control module to control the electric motor to limit the speed of vehicle to a second vehicle speed. The second vehicle speed is less than the first vehicle speed.

In a further aspect, when the shifter position signal indicates that the shifter is in the high position, the vehicle control module is adapted to control the motor control module to control the electric motor to limit a torque of the electric motor to a first torque. When the shifter position signal indicates that the shifter is in the low position, the vehicle control module is adapted to control the motor control module to control the electric motor to limit the torque of the electric motor to a second torque. The second torque is greater than the first torque.

In an additional aspect, an economy mode switch is electrically connected to the vehicle control module. The economy mode switch selectively engages an economy mode of operation of the electric motor. When the vehicle control module receives a signal from the economy mode switch that the economy mode of operation of the electric motor has been engaged and the shifter position signal indicates that the shifter is in the high position, the vehicle control module is adapted to control the motor control module to control the electric motor to limit the speed of the vehicle to a third vehicle speed and to limit the torque of the electric motor to a third torque at least when the vehicle speed is above a fourth vehicle speed. The third vehicle speed is less than the first vehicle speed and greater than the second vehicle speed. The fourth vehicle speed is less than the second vehicle speed. When the vehicle control module receives a signal from the economy mode switch that the economy mode of operation of the electric motor has been engaged and the shifter position signal indicates that the shifter is in the low position, the vehicle control module is adapted to control the motor control module to control the electric motor to limit the speed of the vehicle to the second vehicle speed and to limit the torque of the electric motor to the third torque at least when the vehicle speed is above the fourth vehicle speed.

In a further aspect, when the vehicle control module receives a signal from the economy mode switch that the economy mode of operation of the electric motor has been engaged, the shifter position signal indicates that the shifter is in the high position, and the speed of the vehicle is less than the fourth vehicle speed, the vehicle control module is adapted to control the motor control module to control the electric motor to limit the torque of the electric motor to the first torque. When the vehicle control module receives a signal from the economy mode switch that the economy mode of operation of the electric motor has been engaged, the shifter position signal indicates that the shifter is in the low position, and the speed of the vehicle is less than the fourth vehicle speed, the vehicle control module is adapted to control the motor control module to control the electric motor to limit the torque of the electric motor to the second torque.

In an additional aspect, the plurality of discrete positions includes a reverse position. When the shifter position signal indicates that the shifter is in the reverse position, the vehicle control module is adapted to control the motor control module to cause the electric motor to turn the output shaft of the electric motor in a second direction. The second direction is opposite the first direction. Turning the output shaft in the second direction causes the vehicle to move rearward.

In a further aspect, the plurality of discrete positions includes a reverse position. When the shifter position signal indicates that the shifter is in the reverse position, the vehicle control module is adapted to control the motor control module to cause the electric motor to turn an output shaft of the electric motor in a direction causing the vehicle to move rearward.

In an additional aspect, the shifter includes a lever. The lever is pivotable about an axis generally perpendicular to a vertical plane containing a longitudinal centerline of the vehicle.

In another aspect, the present provides an off-road vehicle having a frame, a cockpit area defined in the frame, a roll cage connected to the frame, the roll cage covering at least in part the cockpit area, a driver seat and a passenger seat disposed side-by-side in the cockpit area, an electric motor supported by the frame, the electric motor being disposed laterally between the driver and passenger seats, at least one first battery electrically connected to the electric motor, the at least one first battery being supported by the frame and being disposed on a right side of the electric motor, at least one second battery electrically connected to the electric motor, the at least one second battery being supported by the frame and being disposed on a left side of the electric motor, two front wheels and two rear wheels supported by the frame, at least two of the wheels being operatively connected to the electric motor for propelling the vehicle, and a steering device being operatively connected to at least two of the wheels for steering the vehicle.

In a further aspect, the at least one first battery is disposed at least in part under the passenger seat and the at least one second battery is disposed at least in part under the driver seat.

In an additional aspect, a front end of the at least one first battery is disposed rearwardly of a front end of the electric motor and forwardly of a rear end of the electric motor, and a front end of the at least one second battery is disposed rearwardly of the front end of the electric motor and forwardly of the rear end of the electric motor.

In a further aspect, the at least one first battery is three first batteries and the at least one second battery is two second batteries.

In an additional aspect, at least one third battery is electrically connected to the electric motor. The at least one third battery is supported by the frame and is disposed forwardly of the electric motor. At least one fourth battery is electrically connected to the electric motor. The at least one fourth battery is supported by the frame and is disposed rearwardly of the electric motor.

In a further aspect, a vertical plane containing a longitudinal centerline of the vehicle passes through the electric motor, the at least one third battery and the at least one fourth battery.

In an additional aspect, the electric motor has an output shaft. The centers of the at least one first battery and of the at least one second battery are disposed vertically below the output shaft. The centers of the at least one third battery and of the at least one fourth battery are disposed vertically above the output shaft.

In another aspect, the present provides an off-road vehicle having a frame, a cockpit area defined in the frame, a roll cage connected to the frame, the roll cage covering at least in part the cockpit area, a driver seat and a passenger seat disposed side-by-side in the cockpit area, an electric motor supported by the frame, the electric motor being disposed laterally between the driver and passenger seats, at least one first battery electrically connected to the electric motor, the at least one first battery being supported by the frame and being disposed forwardly of the electric motor, at least one second battery electrically connected to the electric motor, the at least one second battery being supported by the frame and being disposed rearwardly of the electric motor, two front wheels and two rear wheels supported by the frame, at least two of the wheels being operatively connected to the electric motor for propelling the vehicle, and a steering device being operatively connected to at least two of the wheels for steering the vehicle.

In a further aspect, a vertical plane containing a longitudinal centerline of the vehicle passes through the electric motor, the at least one first battery and the at least one second battery.

In an additional aspect, the electric motor has an output shaft. The at least one first battery is disposed vertically above the output shaft.

In a further aspect, at least one of the at least one first battery is disposed longitudinally between the electric motor and the front wheels.

In yet another aspect, the present provides an off-road vehicle having a frame, a cockpit area defined in the frame, a roll cage connected to the frame, the roll cage covering at least in part the cockpit area, a driver seat and a passenger seat disposed side-by-side in the cockpit area, an electric motor supported by the frame, the electric motor being disposed laterally between the driver and passenger seats, at least one battery electrically connected to the electric motor, a console supported by the frame and disposed laterally between the driver and passenger seats, the console covering at least an upper portion of the electric motor and separating the electric motor from the driver and passenger seats, the console defining a central cooling tunnel housing at least the upper portion of the electric motor, two front wheels and two rear wheels supported by the frame, at least two of the wheels being operatively connected to the electric motor for propelling the vehicle, and a steering device being operatively connected to at least two of the wheels for steering the vehicle.

In an additional aspect, a fan is disposed in the central cooling tunnel forwardly of the electric motor.

In a further aspect, the at least one battery is supported by the frame and is disposed in the central cooling tunnel forwardly of the electric motor.

In an additional aspect, the electric motor has an output shaft. The at least one battery is disposed vertically above the output shaft.

In another aspect, the present provides an off-road vehicle having a frame, a cockpit area defined in the frame, a roll cage connected to the frame, the roll cage covering at least in part the cockpit area, a driver seat and a passenger seat disposed side-by-side in the cockpit area, an electric motor supported by the frame, the electric motor being disposed laterally between the driver and passenger seats, at least one battery electrically connected to the electric motor, the at least one battery being supported by the frame and being disposed rearwardly of the electric motor, two front wheels and two rear wheels supported by the frame, a rear gear assembly operatively connecting the two rear wheels to the electric motor, the rear gear assembly having a rear gear assembly housing, at least one of the at least one battery being disposed vertically above the rear gear assembly housing and having a portion disposed longitudinally between front and rear ends of the rear gear assembly housing, and a steering device being operatively connected to at least two of the wheels for steering the vehicle.

In a further aspect, a front gear assembly operatively connects the two front wheels to the electric motor. At least one other battery is electrically connected to the electric motor. The at least one other battery is supported by the frame and is disposed longitudinally between the electric motor and the front gear assembly housing.

In yet another aspect, the present provides an off-road vehicle having a frame, at least one seat mounted on the frame, an electric motor supported by the frame, two front wheels and two rear wheels supported by the frame, at least two of the wheels being operatively connected to the electric motor for propelling the vehicle, a steering device being operatively connected to at least two of the wheels for steering the vehicle, a cargo box pivotally mounted to the frame rearwardly of the at least one seat, and at least one battery electrically connected to the electric motor, the at least one battery being disposed in the cargo box.

In an additional aspect, a cockpit area is defined in the frame, and a roll cage is connected to the frame. The roll cage covers at least in part the cockpit area. The at least one seat includes a driver seat and a passenger seat disposed side-by-side in the cockpit area. The electric motor is disposed laterally between the driver and passenger seats.

In a further aspect, the cargo box includes: a cargo box body having a front wall, a pair of side walls extending from the front wall, a first floor connected to a lower end of the front and the pair of side walls, and an at least partially opened rear side; a second floor supported inside the cargo box body above the first floor; at least one tailgate for selectively closing the at least partially opened rear side; a first cargo space defined by the cargo box body between the first floor and the second floor; and a second cargo space defined by the cargo box body above the second floor.

In an additional aspect, the at least one battery is disposed in the first cargo space.

In a further aspect, the at least one battery is four batteries.

In another aspect, the present provides an off-road vehicle having a frame, at least one seat mounted on the frame, an electric motor supported by the frame, the electric motor including an output shaft, at least one battery electrically connected to the electric motor, two front wheels and two rear wheels supported by the frame, a reduction drive having a reduction drive shaft operatively connecting at least two of the wheels to the electric motor for propelling the vehicle, the reduction drive being driven by the output shaft, a parking brake mounted to one of the output shaft and the reduction drive shaft, and a steering device being operatively connected to at least two of the wheels for steering the vehicle.

In an additional aspect, a cockpit area is defined in the frame, and a roll cage is connected to the frame. The roll cage covers at least in part the cockpit area. The at least one seat includes a driver seat and a passenger seat disposed side-by-side in the cockpit area. The electric motor is disposed laterally between the driver and passenger seats.

In a further aspect, the parking brake is disposed rearwardly of the electric motor.

In an additional aspect, the electric motor also includes a rotor shaft. The output shaft is coaxial with the rotor shaft.

In a further aspect, the parking brake is a disk brake assembly including: a brake disk connected to the reduction drive shaft for rotation therewith, and a brake caliper selectively engaging the brake disk.

In yet another aspect, the present provides a method of shutting down an electric off-road vehicle. The vehicle includes two rear wheels, two front wheels, an electric motor selectively operatively connected to the wheels, a front driveshaft selectively connected to the electric motor to selectively drive the two front wheels, a rear driveshaft connected to the electric motor to drive the two rear wheels, and at least one battery electrically connected to the electric motor. The method comprises: interrupting operation of the electric motor; and automatically operatively connecting the front driveshaft to the electric motor once the operation of the electric motor has been interrupted.

In an additional aspect, the method further comprises automatically connecting a rear left drive axle to a rear right drive axle such that the two rear wheels are rotatable together.

In a further aspect, the rear left drive axle is connected to the rear right drive axle after the front driveshaft has been operatively connected to the electric motor.

In an additional aspect, the method further comprises automatically connecting a front left drive axle to a front right drive axle such that the two front wheels are rotatable together.

In a further aspect, the front left drive axle is connected to the front right drive axle after the front driveshaft has been operatively connected to the electric motor.

In an additional aspect, the method further comprises automatically engaging a parking brake.

In a further aspect, the method further comprises waiting for a predetermined amount of time from the interrupted operation of the electric motor prior to automatically engaging the parking brake.

In an additional aspect, the parking brake is engaged after the front driveshaft has been operatively connected to the electric motor.

In a further aspect, the method further comprises automatically engaging a parking brake after the rear left drive axle has been connected to the rear right drive axle.

In an additional aspect, the method further comprises automatically engaging a parking brake after the front left drive axle has been connected to the front right drive axle.

In an additional aspect, interrupting operation of the electric motor includes moving a vehicle key to an "off" position.

For purposes of this application the term "recreational utility vehicle" (RUV) refers to an "opened" wheeled vehicle (contrary to a pickup truck which is a "closed" vehicle due to its closed passenger cabin) designed for off-road use which usually has side-by-side seating.

Also, terms related to spatial orientation such as forwardly, rearwardly, front, rear, upper, lower, left, and right, are as they would normally be understood by a driver of the vehicle sitting in a normal driving position.

Embodiments of the present invention have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

Further features and advantages of the present invention will become apparent from the following detailed description, taken in combination with the appended drawings, in which.

DETAILED DESCRIPTION

Embodiments of the present invention will be described with respect to a recreational utility vehicle (RUV). However it contemplated that aspects of the embodiments of the present invention could be used on other types of off-road vehicles having an open cockpit area, such as all-terrain vehicles having a straddle-seat for example.

Figure 1:
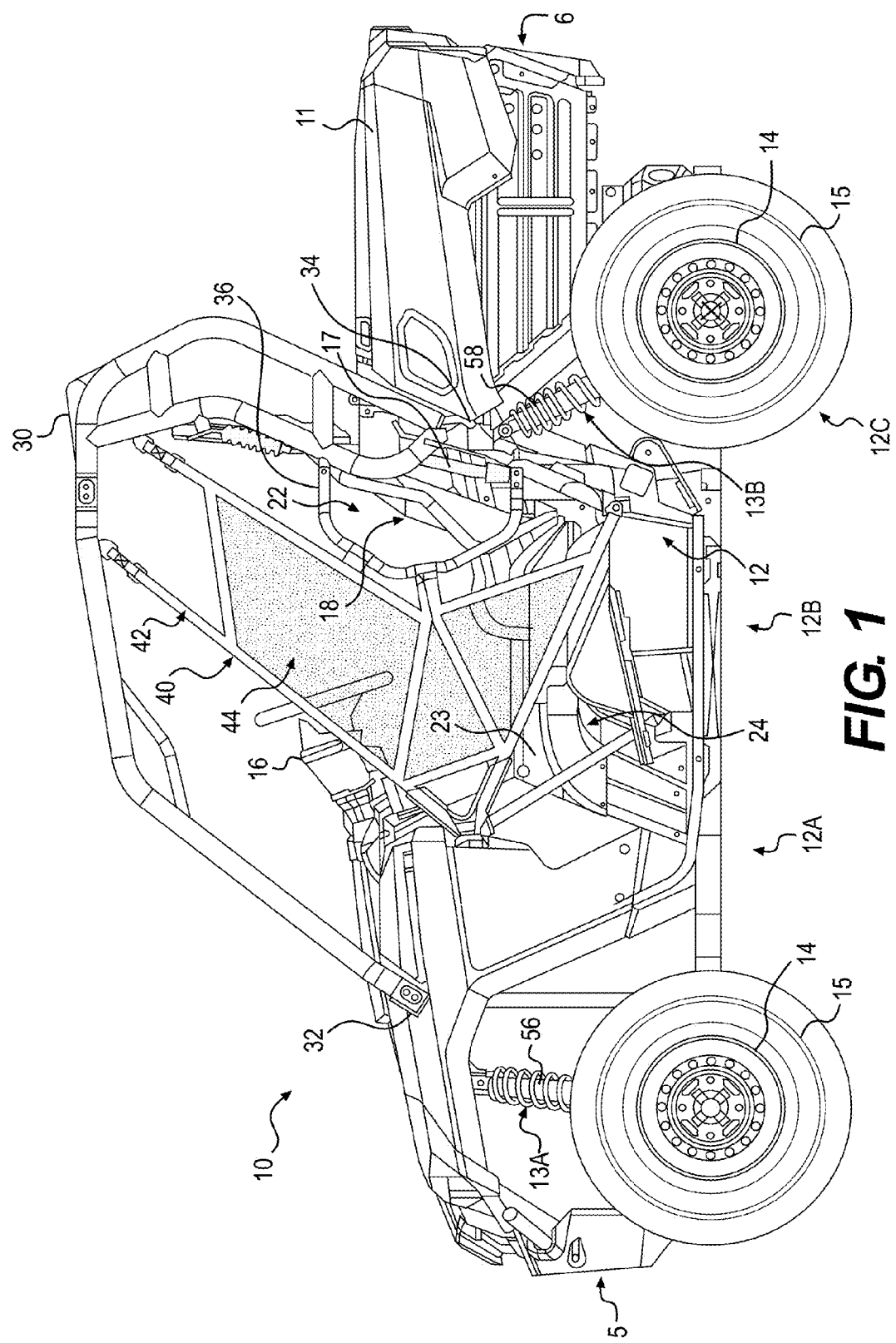
FIG. 1 is a left side elevation view of an RUV, with fairings partially removed for clarity.
Figure 2:
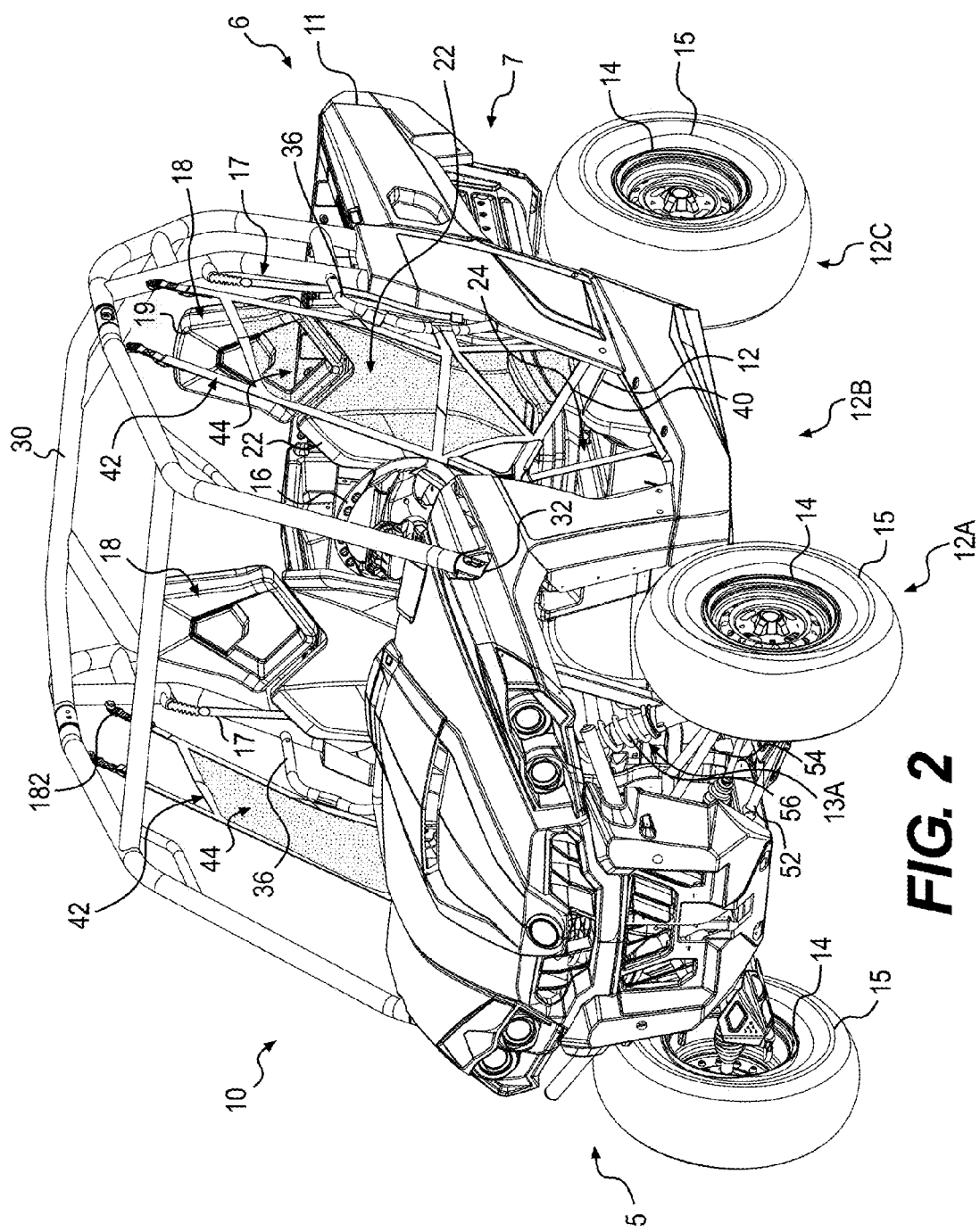
FIG. 2 is a perspective view, taken from a front, left side, of the RUV of FIG. 1.
Figure 3:
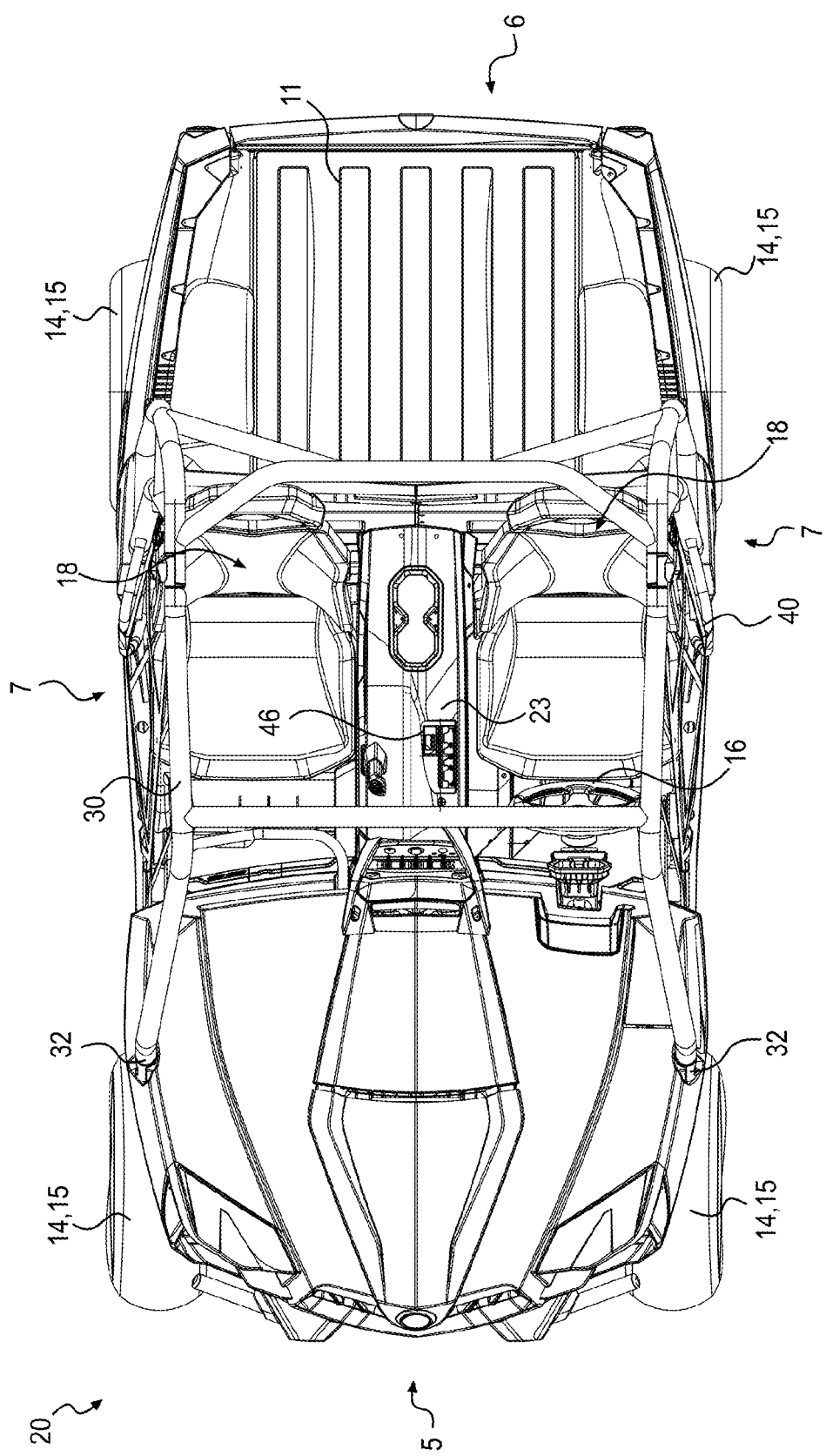
FIG. 3 is a top plan view of the RUV of FIG. 1.
Figure 4:
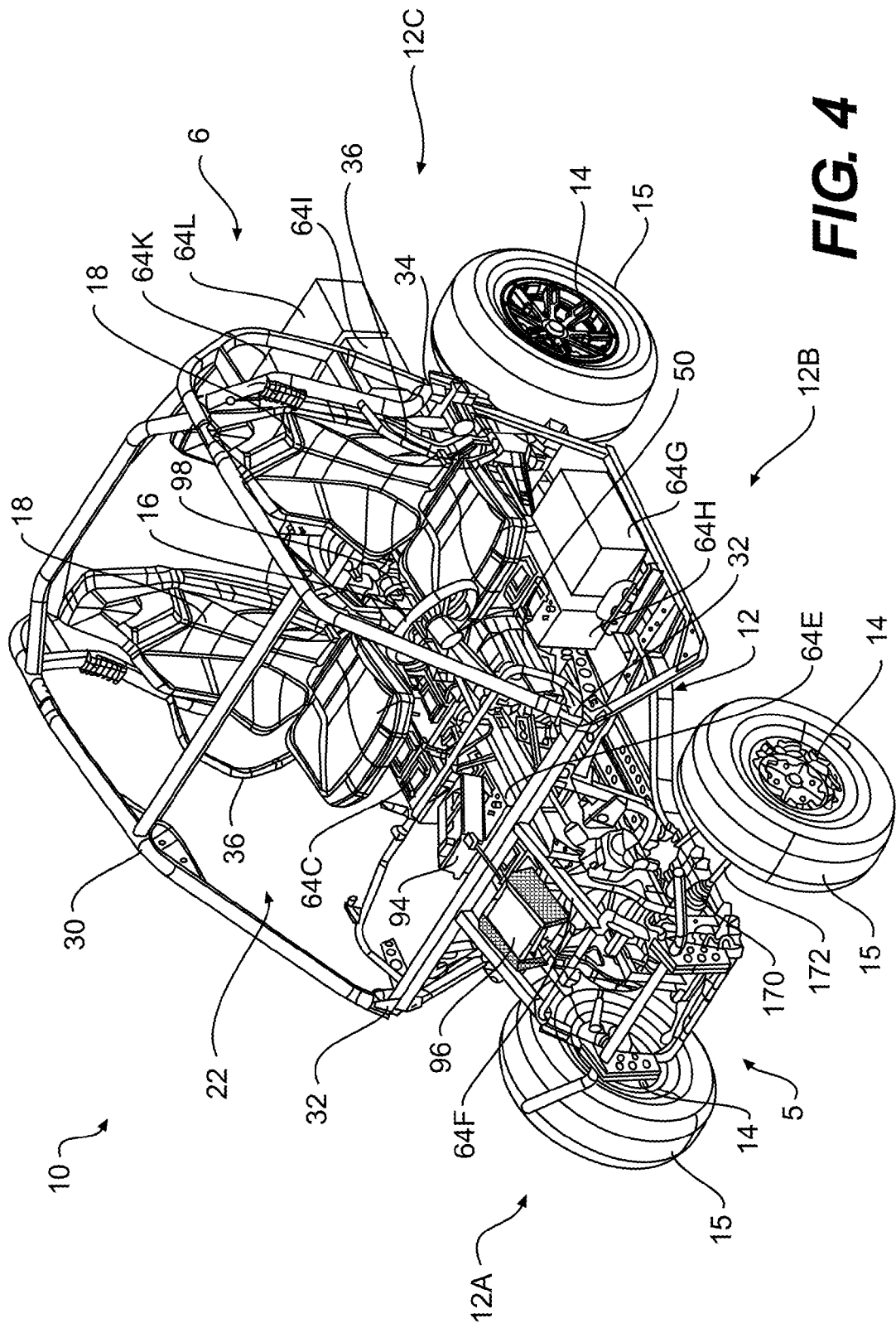
FIG. 4 is a perspective view, taken from a front, left side, of the RUV of FIG. 1, with fairings and other elements removed for clarity.
Figure 5:
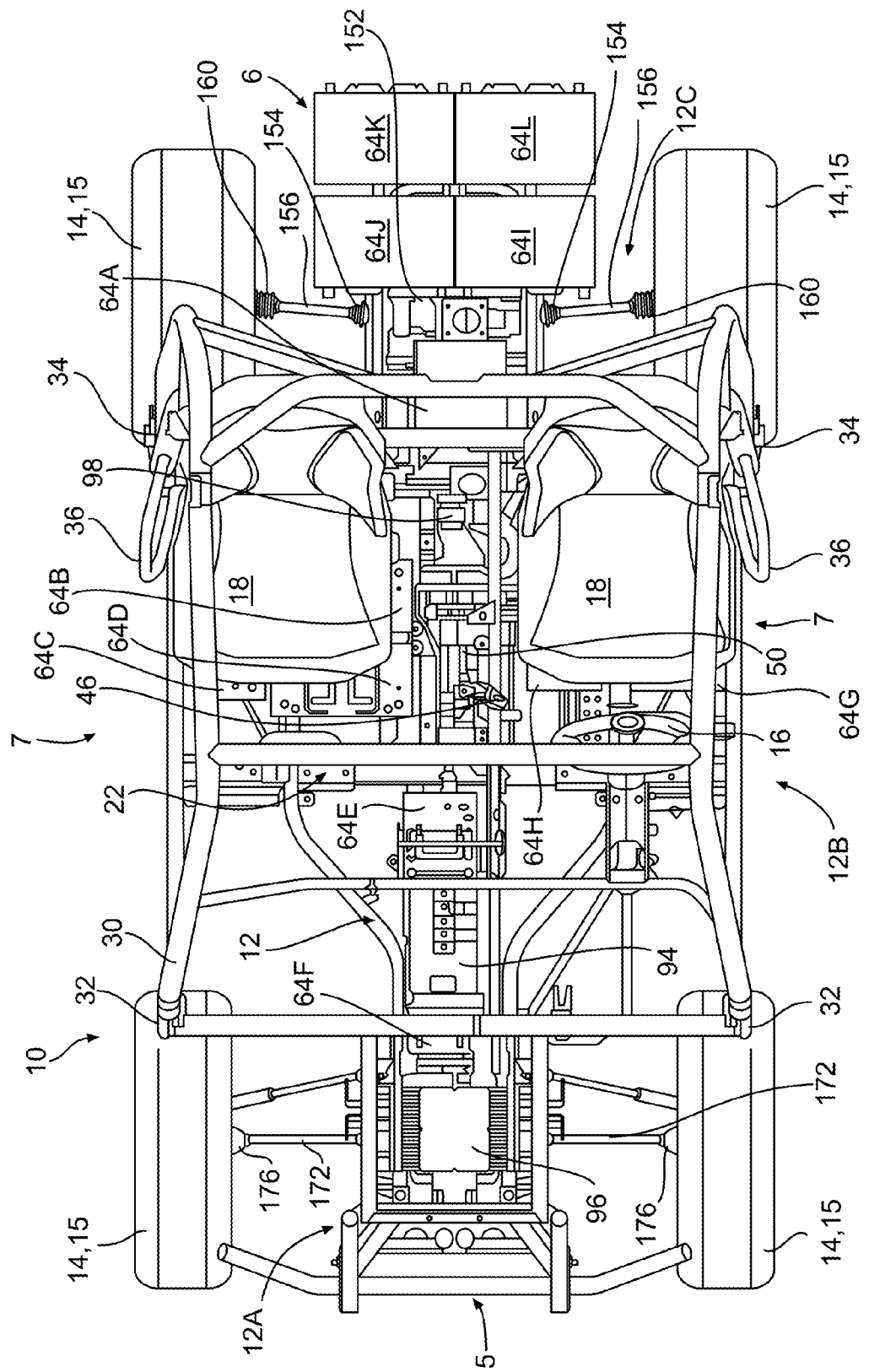
FIG. 5 is a top plan view of the RUV of FIG. 4.

FIGS. 1 to 3 illustrate an RUV 10 having a front end 5, a rear end 6, and two lateral sides 7 (left and right). The RUV 10 includes a frame 12 to which a vehicle body is mounted. The frame 12 has a front portion 12A, a middle portion 12B and a rear portion 12C. A pair of front wheels 14 is suspended from the front portion 12A of the frame 12 via front suspensions 13A, described in greater detail below. A pair of rear wheels 14 is suspended from the rear portion 12C of the frame 12 via rear suspensions 13B, described in greater detail below. Each of the four wheels 14 has a tire 15. A cockpit area 22 is disposed in the middle portion 12B of the frame 12. The cockpit area 22 comprises two seats 18 (left and right). The left and right seats 18 are mounted laterally beside each other to accommodate a driver and a passenger (riders), respectively, of the RUV 10. The seats 18 are bucket seats each having a seat base and a backrest. It is contemplated that the seats 18 could be other types of recumbent seats. A console 23 (FIG. 3) positioned between the right and left seats 18 covers and separates an electric motor 50 (FIG. 4) of the vehicle 10 from the driver and the passenger. The console 23 defines in part a central cooling tunnel allowing air to flow from the front end 5 of the vehicle 10 to the rear end 6 of the vehicle to cool the electric motor 50. International Patent Publication Number WO 2009/096977 A1, published Aug. 6, 2009, the entirety of which is incorporated herein by reference, describes a cooling tunnel for an RUV similar to the one defined by the console 23 for the RUV 10. Each seat 18 is provided with a safety belt 17.

The cockpit area 22 is open at the two lateral sides 7 of the RUV 10, forming two lateral passages 24 (left and right), through which the riders can ingress and egress the RUV 10. A lateral cover 40 is selectively disposed across each lateral passage 24. The lateral cover 40 extends vertically from a roll cage 30 to a point vertically lower than the seat base 17. It is contemplated that only one of the two lateral passages 24 could be selectively partially covered by a lateral cover 40. The lateral covers 40 are made of flexible straps 42 and flexible panels 44 of meshed material. When the riders are riding the RUV 10, the lateral covers 40 are intended to be disposed across the lateral passages 24. However, when the riders are not riding the RUV 10 and they desired either ingress or egress the cockpit area 22, the lateral cover 40 can be opened to clear the lateral passages 24.

The roll cage 30 is connected to the frame 12 and is disposed above the cockpit area 22. The roll cage 30 is an arrangement of metal tubes that contributes to protecting the riders in the event the vehicle 10 rolls over. The roll cage 30 has several attachment points to the frame 12. Toward the front 5 of the RUV 10, the roll cage 30 connects to the frame 12 at front attachment points 32 (left and right). The front attachment points 32 are located longitudinally between a roll axis of the front wheels 14 and a foremost point of the seats 18. Toward the rear 6 of the RUV 10, the roll cage 30 connects to the frame 12 at rear attachment points 34 (left and right). The rear attachment points 34 are located longitudinally between a roll axis of the rear wheels 14 and a rearmost point of the seat base 17 of the seats 18. The roll cage 30 further includes a pair of lateral restraining members 36, one on each side of a rear part of the roll cage 30. The lateral restraining members 36 are U-shaped tubes that extend forward from the rear part of the roll cage 30 partially into the lateral passages 24. It is contemplated that the lateral restraining members 36 could have a different shape. It is also contemplated that the restraining members 36 could be omitted.

A steering device 16 including a steering wheel is disposed in front of the left seat 18. It is contemplated that, the steering wheel could be disposed in front of the right seat 18. The steering device 16 is operatively connected to the two front wheels 14 to permit steering of the RUV 10.

Figure 6:
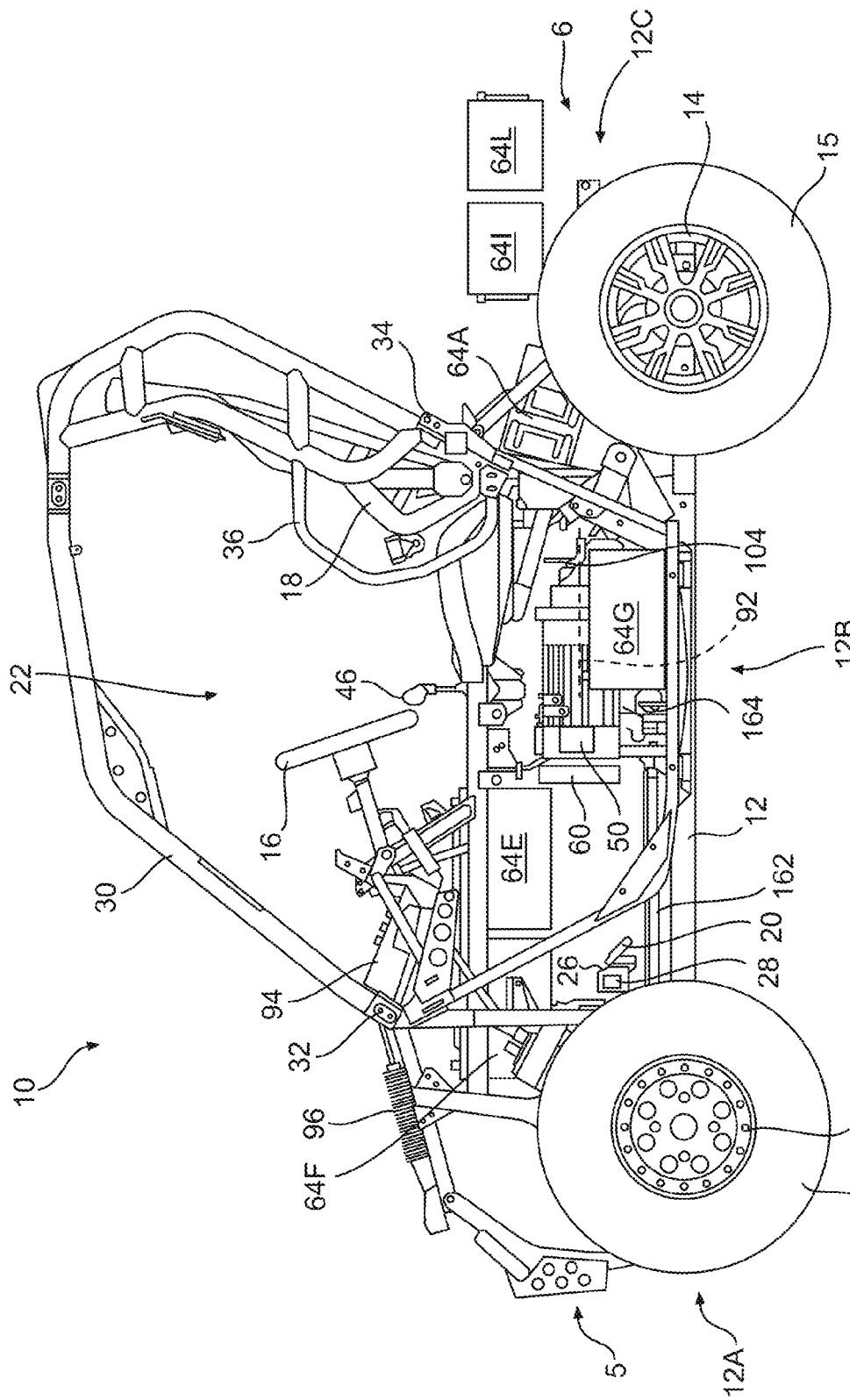
FIG. 6 is a left side elevation view of the RUV of FIG. 4.

As seen in FIG. 6, an accelerator pedal 20 is located in front of the driver seat 18, above a floor of the cockpit area 22, below the steering device 16. The pedal 20 is pivotally connected to a bracket 26. A pedal position sensor 28 is mounted to the bracket 26 and is connected to a pivot shaft (not shown) of the pedal 20 located forwardly of the pedal 20. The pedal position sensor 28 senses a position of the pedal 20. The accelerator pedal 20 is used by the driver to control a speed of the vehicle 10. A brake pedal (not shown) is located in front of the driver seat 18, above a floor of the cockpit area 22, below the steering device 16, to the left of the accelerator pedal. The brake pedal is used by the driver to brake the vehicle 10. A shifter 46 is located in and extends from the console 23 between the seats 18. The shifter 46 is used by the driver to select a mode of operation of the vehicle 10. The modes of operation are: park, reverse, neutral, high, and low. It is contemplated that one or more modes of operation could be omitted and/or that other modes of operation could be provided. For example, the two forward modes of operation (i.e. high and low) could be replaced by a single forward mode of operation (i.e. drive). The shifter 46 and the various modes of operation will be described in greater detail below. The vehicle 10 is provided with additional lever and switches to control an operating condition of the vehicle 10, some of which will be described further below.

A cargo box 11 is pivotally mounted to the frame 12 rearwardly of the seats 18. The cargo box 11 will be described in greater detail below. It is contemplated that the cargo box 11 could be omitted.

As best seen in FIG. 2, each front suspension 13A includes lower and upper A-arms 52, 54. Each lower A-arm 52 is pivotally connected at one end to the front portion 12A of the frame 12 and pivotally connected to a lower portion of a corresponding kingpin (not shown) at the other end. Each front wheel 14 is rotationally connected to its corresponding kingpin. Each upper A-arm 54 is disposed above its corresponding lower A-arm 52. Each upper A-arm 54 is pivotally connected at one end to the front portion 12A of the frame 12 and pivotally connected to an upper portion of its corresponding kingpin at the other end. A shock absorber 56 is connected between the outer end of each upper A-arm 54 and the front portion 12A of the frame 12. A sway bar (not shown) disposed rearwardly of the front suspensions 13A, is connected to both upper A-arms 54 to increase the roll stiffness of the suspensions 13A.

Each rear suspension 13B includes a swing arm (not shown) and a shock absorber 58 (see FIG. 1). A lower end of each shock absorber 58 is connected to its corresponding swing arm. From its corresponding swing arm, each shock absorber 58 extends upwardly and forwardly to connect to the frame 12. A torsion bar (not shown) is operatively connected between both swing arms to increase the roll stiffness of the suspensions 13B.

With reference to FIGS. 4 to 15, internal components and the cargo box 11 of the vehicle 10 will be described in greater detail.

Figure 9:
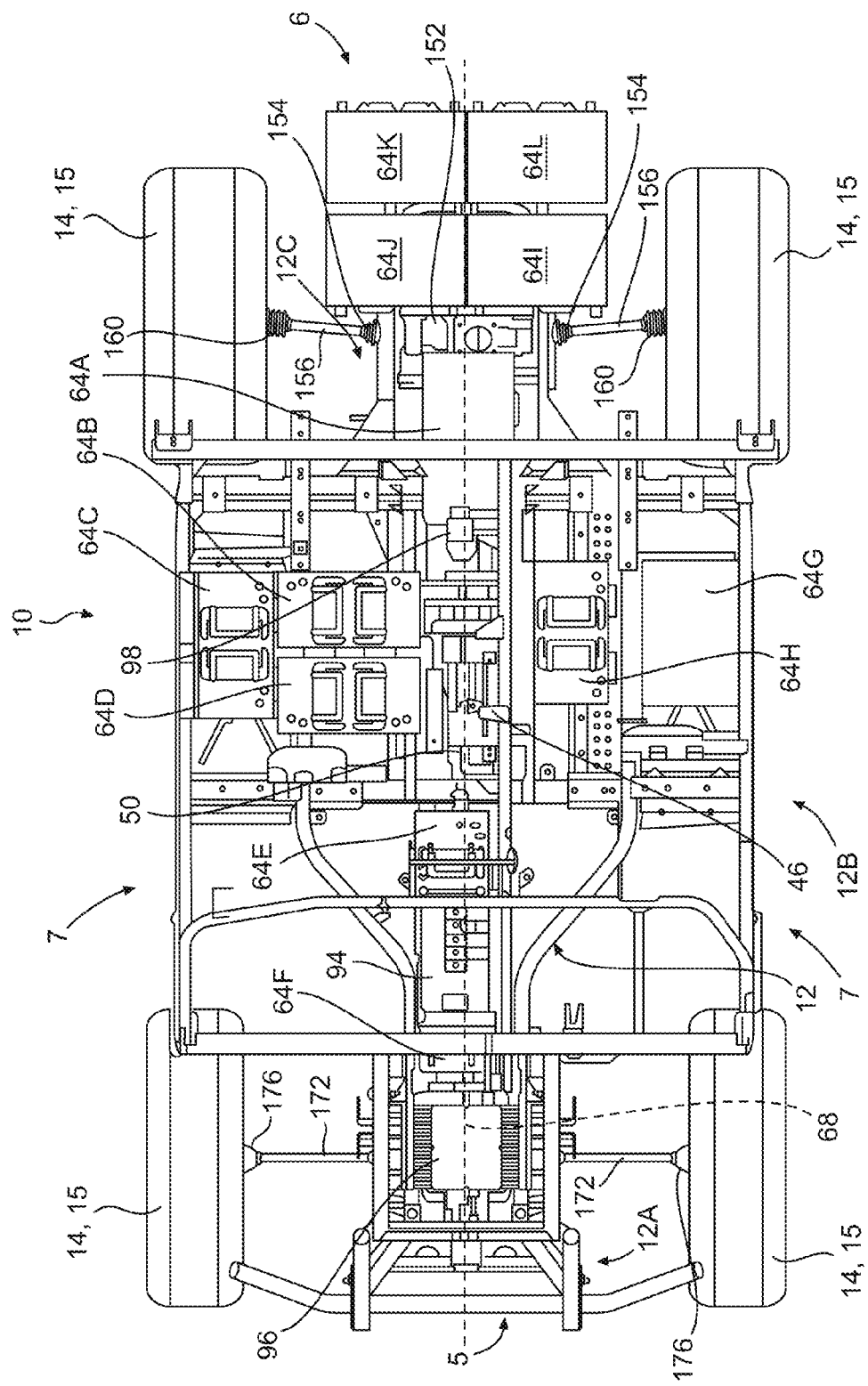
FIG. 9 is a top plan view of the RUV of FIG. 8.

The electric motor 50 is mounted to the middle portion 12B of frame 12 and is disposed between the right and the left seats 18. As can be seen in FIG. 9, the electric motor 50 is located laterally on the frame 12 such that a vertical plane containing a longitudinal centerline 68 of the vehicle 10 passes through the electric motor 50. The electric motor 50 is operatively connected to the four wheels 14 to power the RUV 10 and selectively switches between driving two and four wheels 14, as will be described in greater detail below. It is contemplated that the electric motor 50 could be operatively connected only to the front wheels 14 or only to the rear wheels 14. The electric motor 50 is a three-phase AC-induction motor having a rated voltage of 29 volts. It is contemplated that other types of electric motors could be used, such as DC motors. The electric motor 50 will be described in greater detail below. The electric motor 50 is cooled by the air flowing inside the central cooling tunnel formed by the console 23 when the RUV 10 is in motion. However, this flow of air may be insufficient to cool the electric motor 50. For example, the air flow may be insufficient when the RUV 10 is operating at low speed or is at rest for example. For this reason, a fan 60 (only shown in FIGS. 6, 7 and 10) is disposed inside the cooling tunnel forwardly of the electric motor 50 to create an air flow over the electric motor 50 when its temperature exceeds a predetermined temperature. The fan 60 is turned on and off based on a signal received from a temperature sensor 62 (schematically shown in FIG. 23) disposed inside the electric motor 50 to sense a temperature of the electric motor 50. It is contemplated that the fan could be omitted.

Power is supplied to the electric motor 50 by a plurality of batteries 64A to 64L. The batteries 64A to 64L are 12 volt lead-acid or lithium-phosphate batteries. It is contemplated that other types of batteries could be used, such as other types of lithium batteries.

Figure 10:
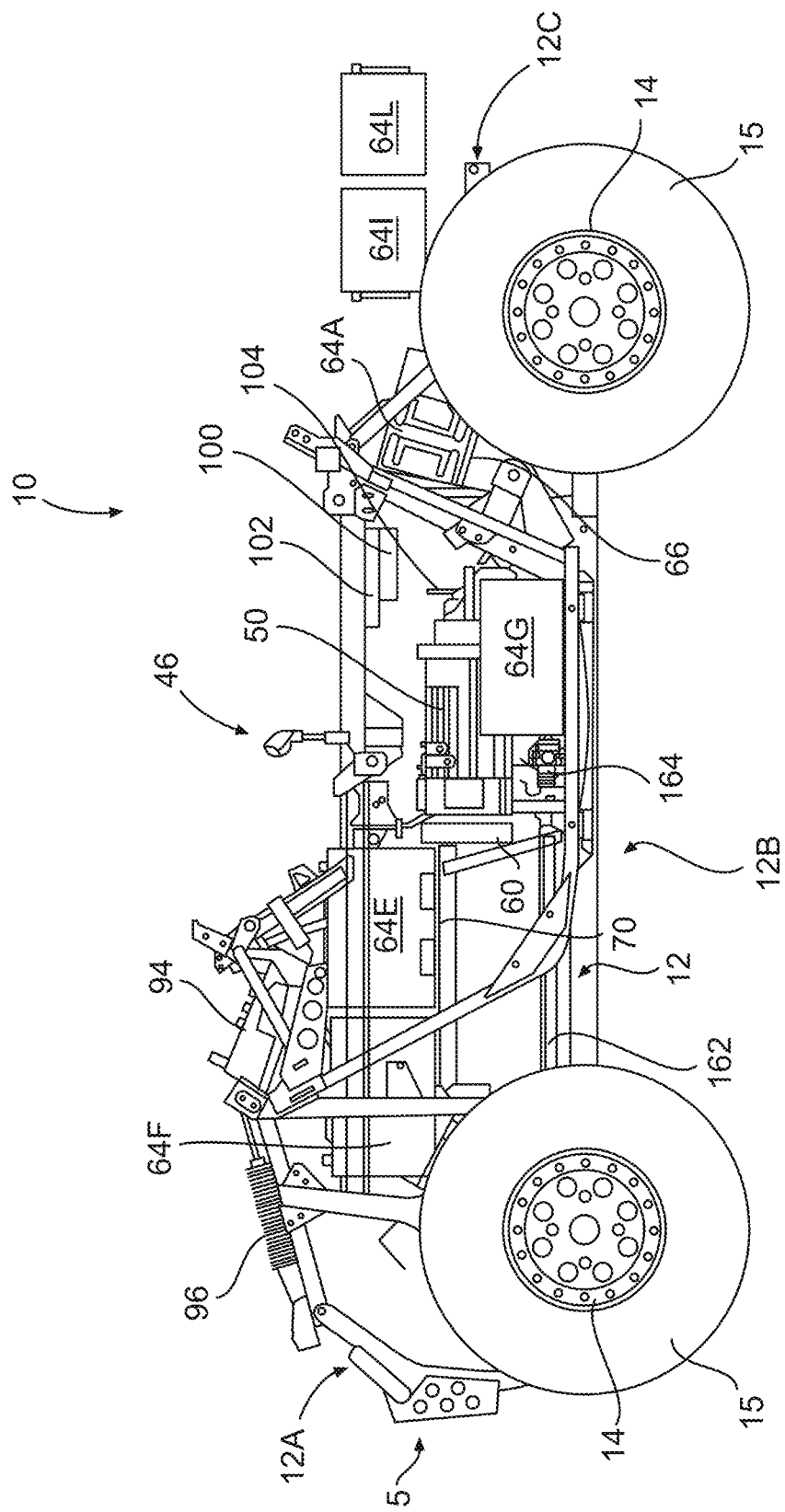
FIG. 10 is a left side elevation view of the RUV of FIG. 8.

The battery 64A is mounted rearwardly of the electric motor 50 on a bracket 66 of the frame 12. As can be seen in FIG. 9, the battery 64A is located laterally on the frame 12 such that the vertical plane containing the longitudinal centerline 68 of the vehicle 10 passes through the battery 64A. As can be seen in FIG. 10, the battery 64A is slanted rearwardly. Note that in FIG. 13, the battery 64A is shown in transparency such that components disposed under it can be seen.

Figure 13:
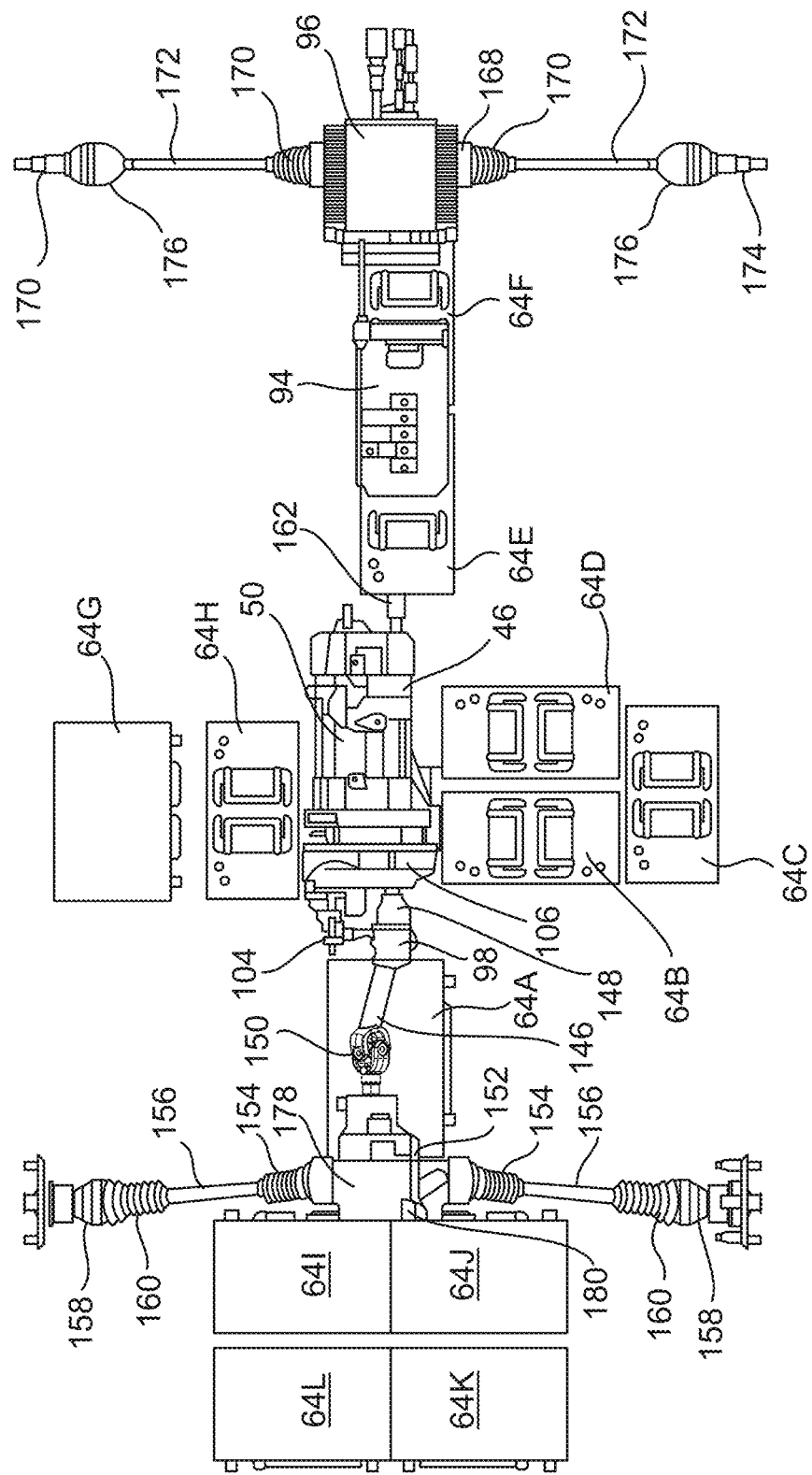
FIG. 13 is a top plan view of the power train of the RUV of FIG. 1.
Figure 14:
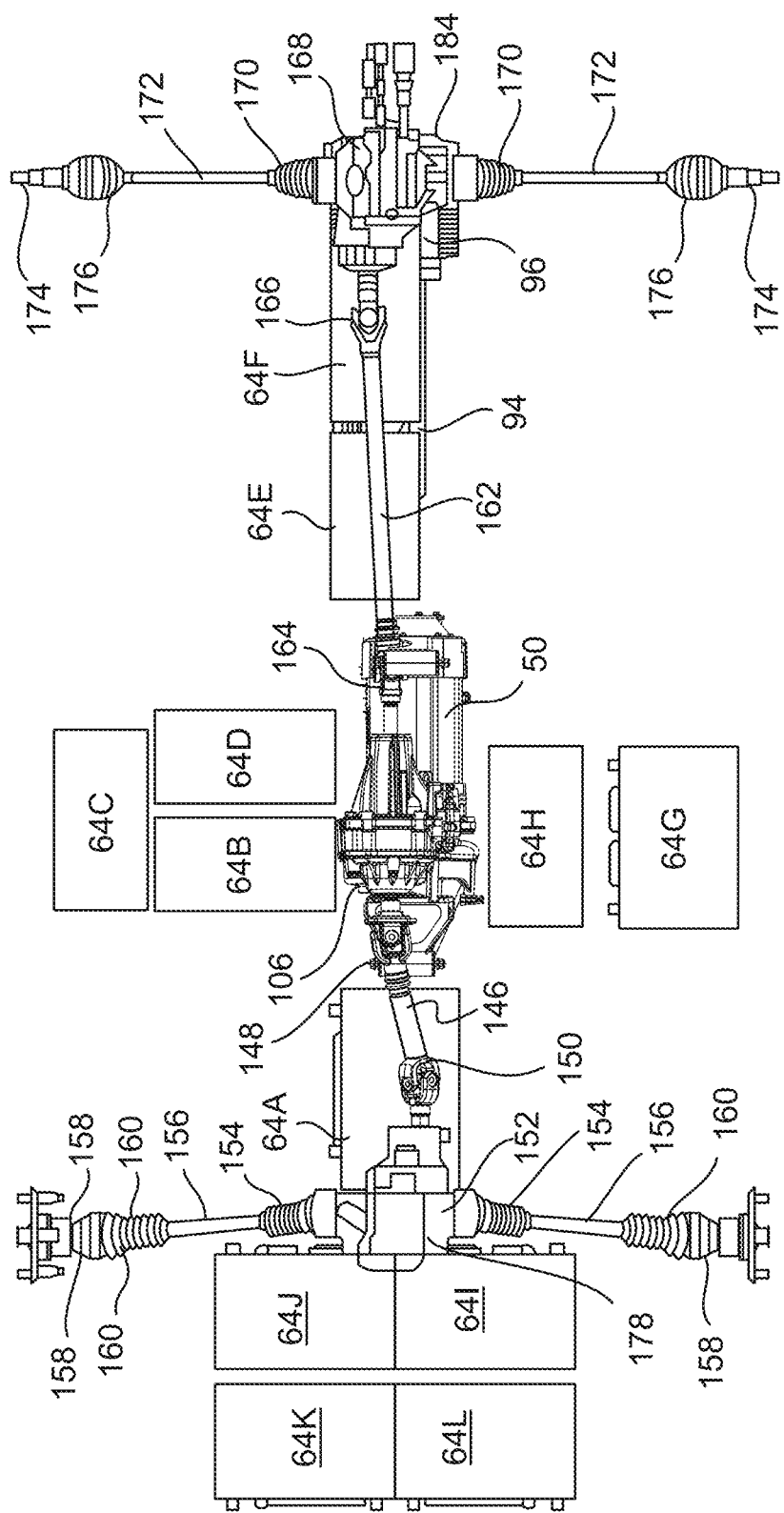
FIG. 14 is a bottom plan view of the power train of FIG. 13.

The batteries 64B to 64D are supported by the middle portion of the frame 12B and are located under the passenger seat 18. As such the batteries 64B to 64D are located on a right side of the electric motor 50. As best seen in FIGS. 13 and 14, the batteries 64B to 64D are disposed on the middle portion of the frame 12B such that they are mostly disposed between the front and rear ends of the electric motor 50 in a longitudinal direction of the vehicle 10. More specifically, the front ends of all three batteries 64B to 64D are disposed between the front and rear ends of the electric motor 50 in a longitudinal direction of the vehicle 10.

The batteries 64A to 64D are electrically connected together in series to form a first 48 volt battery pack.

The batteries 64E and 64F are mounted in the central cooling tunnel forwardly of the electric motor 50 on a member 70 (see FIG. 10) of the frame 12. The battery 64E is disposed longitudinally between the front wheels 14 and the electric motor 50. As can be seen in FIG. 9, the batteries 64E and 64F are located laterally on the frame 12 such that the vertical plane containing the longitudinal centerline 68 of the vehicle 10 passes through the batteries 64E and 64F.

The batteries 64G and 64H are supported by the middle portion of the frame 12B and are located under the driver seat 18. As such the batteries 64G and 64H are located on a left side of the electric motor 50. As can be best seen in FIGS. 13 and 14, the batteries 64G and 64H are disposed on the middle portion of the frame 12B such that they are mostly disposed between the front and rear ends of the electric motor 50 in a longitudinal direction of the vehicle 10. More specifically, the front ends of both batteries 64G and 64H are disposed between the front and rear ends of the electric motor 50 in a longitudinal direction of the vehicle 10.

The batteries 64E to 64H are electrically connected together in series to form a second 48 volt battery pack.

Figure 11:
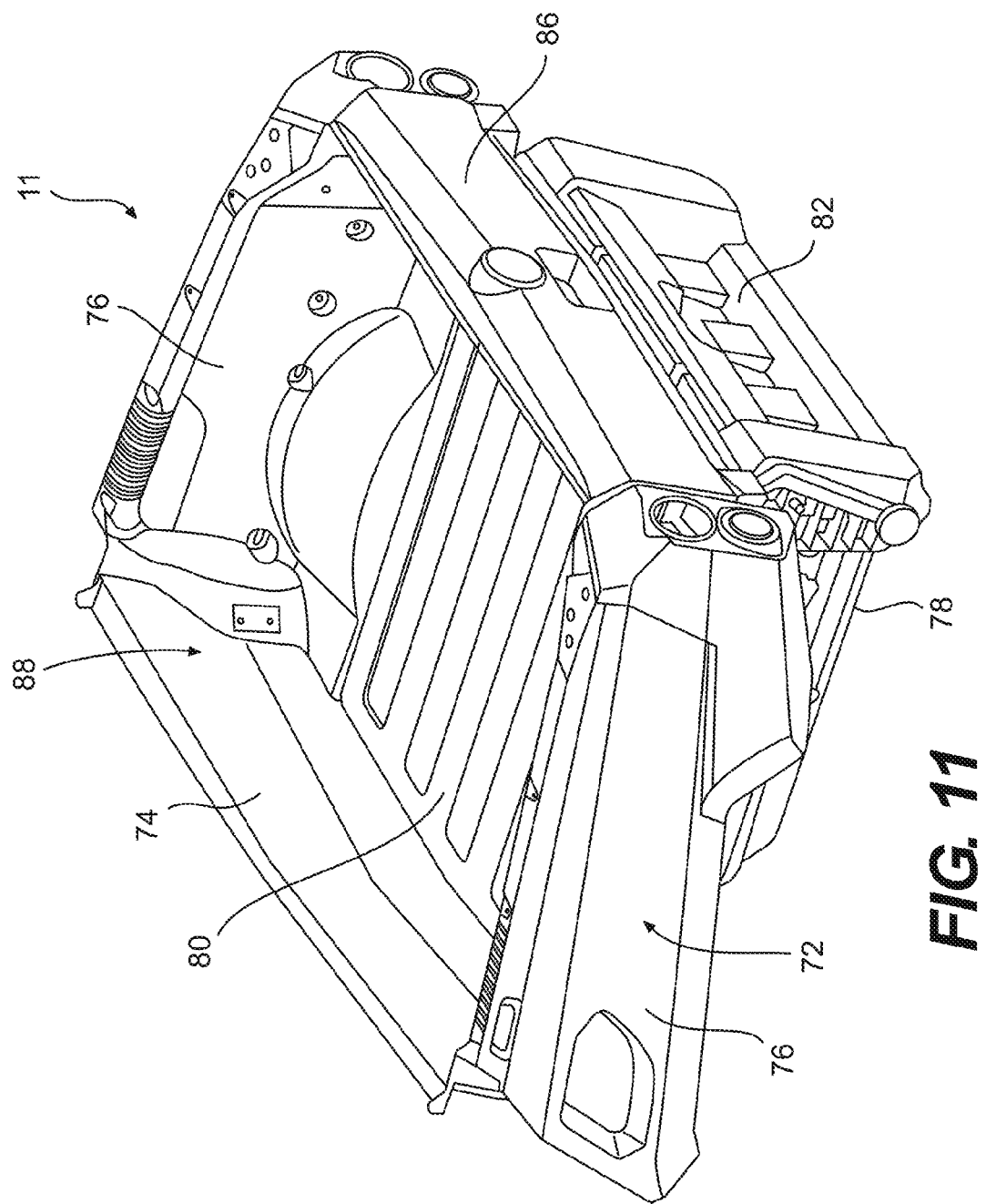
FIG. 11 is a perspective view, taken from a rear, left side, of a cargo box of the RUV of FIG. 1.
Figure 12:
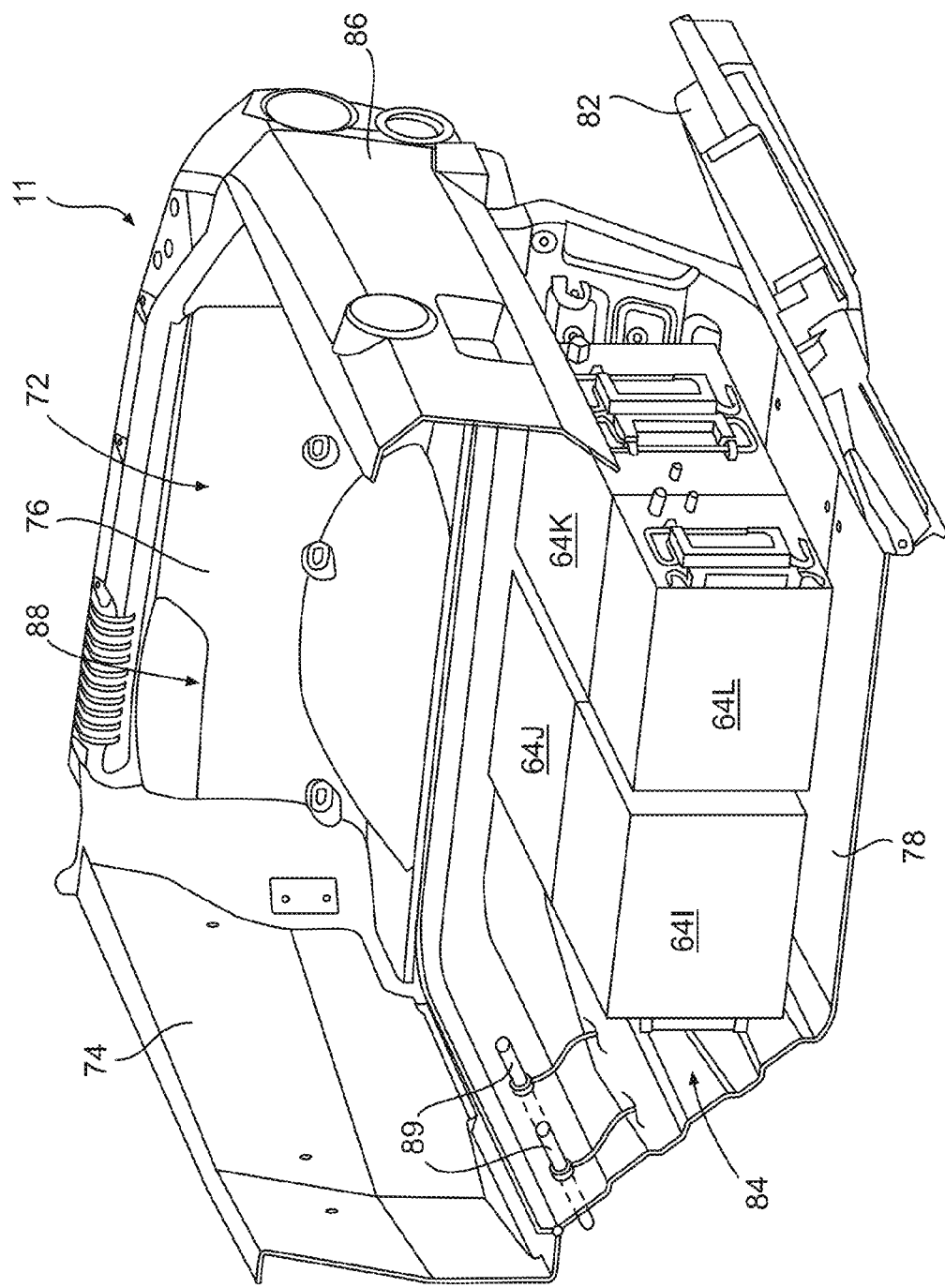
FIG. 12 is a cross-sectional view of the cargo box of FIG. 11, with the upper floor removed for clarity.

The batteries 64I to 64L are disposed in the cargo box 11. As can be seen, the batteries 64I and 64J are disposed side-by-side near a front of the cargo box 11 and the batteries 64L and 64K are disposed side-by-side behind the batteries 64I and 64J partially behind the wheels 14, 15. The cargo box 11 has a cargo box body 72. As best seen in FIGS. 11 and 12, the cargo box body 72 has a front wall 74, a pair of side walls 76 extending rearwardly from the front wall 74, a lower floor 78 connected to a lower end of the front and the pair of side walls 74, 76, and an opened rear side. A bracket (not shown) is connected to a bottom of the lower floor 78. The bracket pivotally connects the cargo box 11 to the frame 12C such that the cargo box 11 can pivot from the illustrated generally horizontal position to a pivoted position (not shown). By pivoting the cargo box 11, the contents of the cargo box 11 (other than the batteries 64I to 64L) can easily be dumped on the ground. A latch assembly (not shown) is used to lock the cargo box 11 in the horizontal position. A user of the RUV 10 can release the latch assembly to allow the cargo box 11 to pivot. A pneumatic cylinder (not shown) connects the cargo box body 72 to the rear portion of the frame 12C to prevent the cargo box 11 from pivoting too quickly between the horizontal and the pivoted position. An upper floor 80 is selectively supported in the cargo box body 72 above the lower floor 78 adjacent the front wall 74 and the pair of side walls 76. The upper floor 80 divides the opened rear side of the cargo box body 72 between a lower opened portion and an upper opened portion. The lower opened portion extends from the lower floor 78 to the upper floor 80 and is selectively closed by a lower tailgate 82, thereby defining a lower cargo space 84. The upper opened portion extends from the upper floor 80 to the upper end of the side walls 76 and is selectively closed by an upper tailgate 86, thereby defining an upper cargo space 88. It is contemplated that the lower and upper tailgates 82, 86 could be replaced by a single tailgate selectively closing both the lower and upper opened portions of the cargo box body 72. The batteries 64I to 64L are disposed in the lower cargo space 84. The batteries 64I to 64L are fastened to the lower floor 78 by straps and/or brackets (not shown). As shown in FIG. 12, the batteries 64I to 64L can be accessed by removing the upper floor 80 and/or by opening the lower tailgate 82. International Patent Publication Number WO 2009/096973 A1, published Aug. 6, 2009, the entirety of which is incorporated herein by reference, describes various embodiments of cargo boxes similar to the cargo box 11. It is contemplated that the batteries 64I to 64L could be connected to the rear portion 12C of the frame 12 under the cargo box 11. In such an embodiment, the batteries 64I to 64L do not pivot with the cargo box 11. Also, it is contemplated that in such an embodiment the cargo box 11 could be thinner to accommodate the thickness of the batteries 64I to 64L and as such may only have a single cargo space.

The batteries 64I to 64L are electrically connected together in series to form a third 48 volt battery pack. The batteries 64I to 64L are electrically connected to the rest of the electrical system of the RUV 10 via a pair of conductive studs 89 passing through the front of the cargo box 11. Insulating sleeves (not shown) are disposed around the conductive studs 89 to electrically insulate the cargo box from the studs 89. It is contemplated that the batteries 64I to 64L could be omitted.

Figure 7:
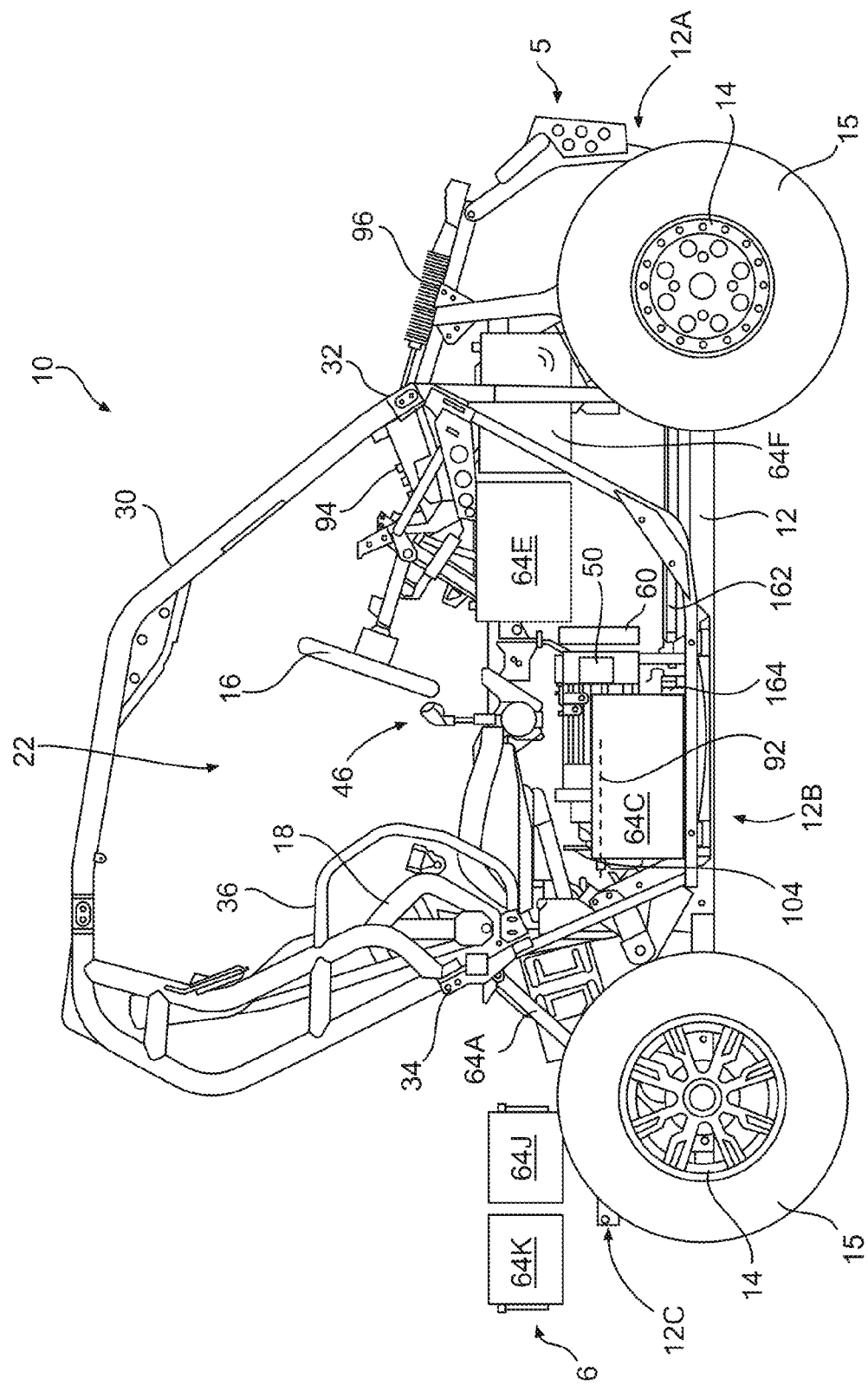
FIG. 7 is a right side elevation view of the RUV of FIG. 4.
Figure 8:
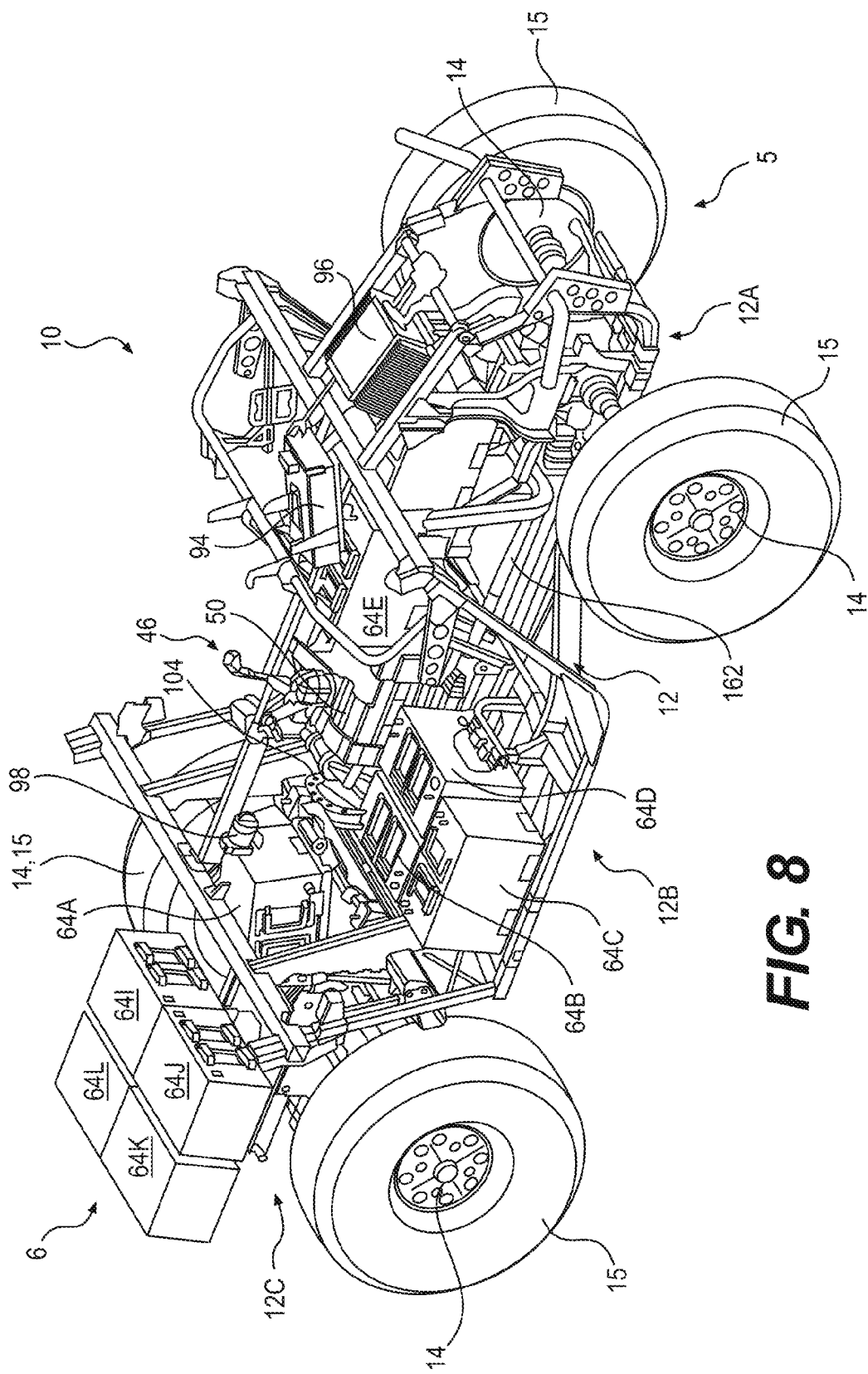
FIG. 8 is a perspective view, taken from a front, right side, of the RUV of FIG. 4, with a roll cage, seats, and other elements removed for clarity.

As best seen in FIGS. 6 and 7, the geometric center of each of the batteries 64B to 64D, 64G and 64H is located vertically below an output shaft 90 of the electric motor 50, the axis of rotation of which is illustrated by line 92 in FIGS. 6 and 7. The batteries 64E, 64F and 64I to 64L are disposed vertically above the output shaft 90. The geometric center of the battery 64A is located vertically above the output shaft 90.

The three battery packs (i.e. batteries 64A to 64D, batteries 64E to 64H, and batteries 64I to 64L) are electrically connected in parallel to a battery management system (BMS) 94. The BMS 94 is mounted to the frame 12 above the batteries 64E, 64F and forwardly of the electric motor 50. The BMS 94 is electrically connected to a charger 96. It is contemplated that depending on the type of batteries being used, that the BMS 94 could be omitted, in which case the batteries 64A to 64L would be electrically connected in parallel to the charger 96. The charger 96 is mounted to the frame 12 above the batteries 64E, 64F and forwardly of the BMS 94. The three battery packs (i.e. batteries 64A to 64D, batteries 64E to 64H, and batteries 64I to 64L) are also electrically connected in parallel to a relay (or contactor) 98 disposed in the central cooling tunnel. The relay 98 is electrically connected to a motor control module (MCM) 100. The MCM 100 is electrically connected to the electric motor 50 and to a vehicle control module (VCM) 102. As shown in FIG. 10, the MCM 100 and the VCM 102 are mounted on top of each other in the central cooling tunnel above and rearwardly of the electric motor 50. The BMS 94, the charger 96, the MCM 100 and the VCM 102 and their respective functions will be described in greater detail below with respect to FIG. 26.

It is contemplated that an arrangement of batteries and of components of the electrical system of the RUV 10 could differ from the one described above. FIGS. 17 to 21 illustrate one such alternative arrangement of batteries and of components of the electrical system in an RUV 10'. For simplicity, elements of the RUV 10' shown in FIGS. 17 to 21 which are the same or similar to the ones described above and further below with respect to the RUV 10', have been labeled with the same reference numerals and will not be described again in detail.

Figure 18:
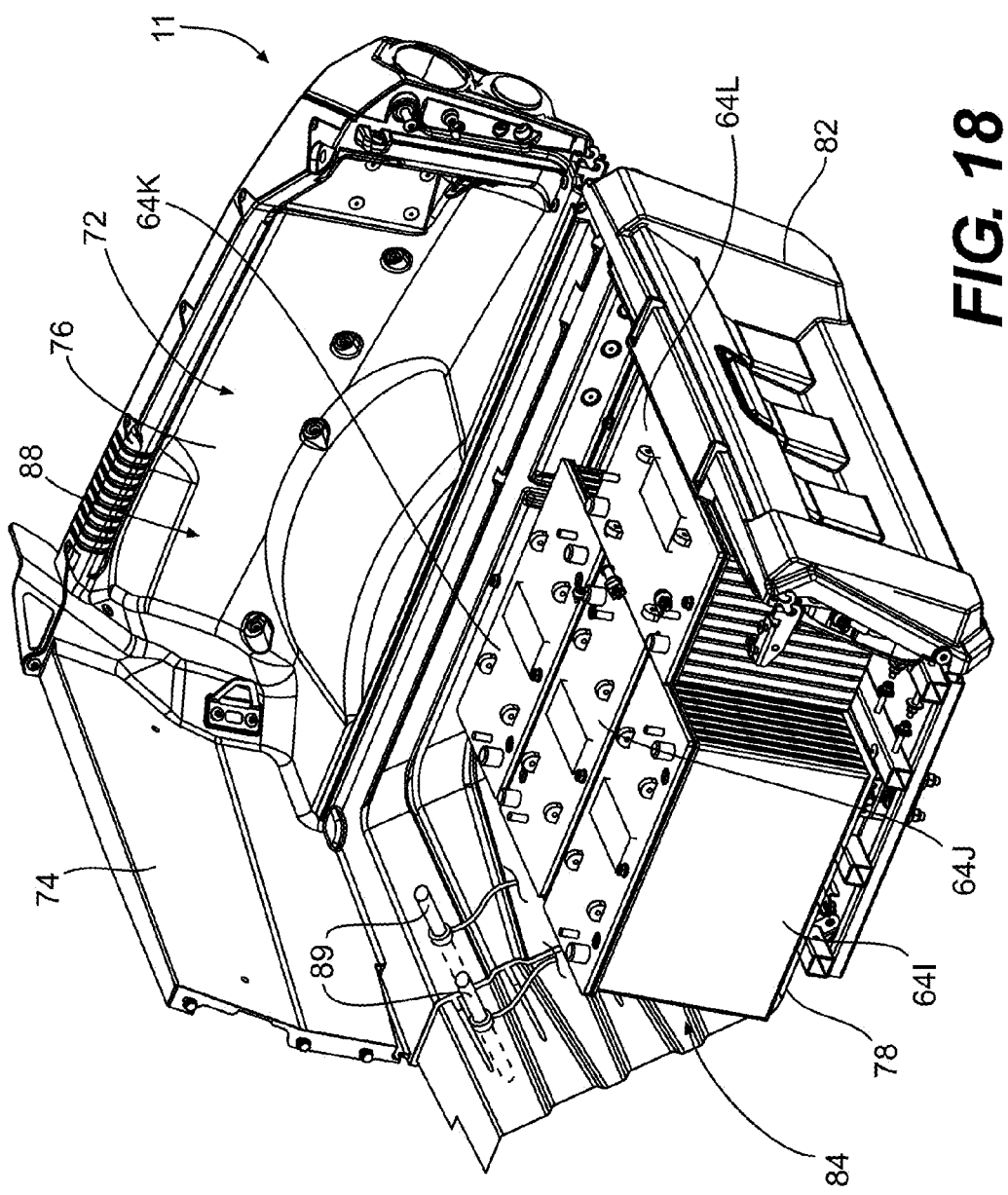
FIG. 18 is a cross-sectional view of the cargo box of FIG. 11 with the alternative arrangement of the batteries of FIG. 17 and with the upper floor and upper tailgate removed for clarity.
Figure 19:
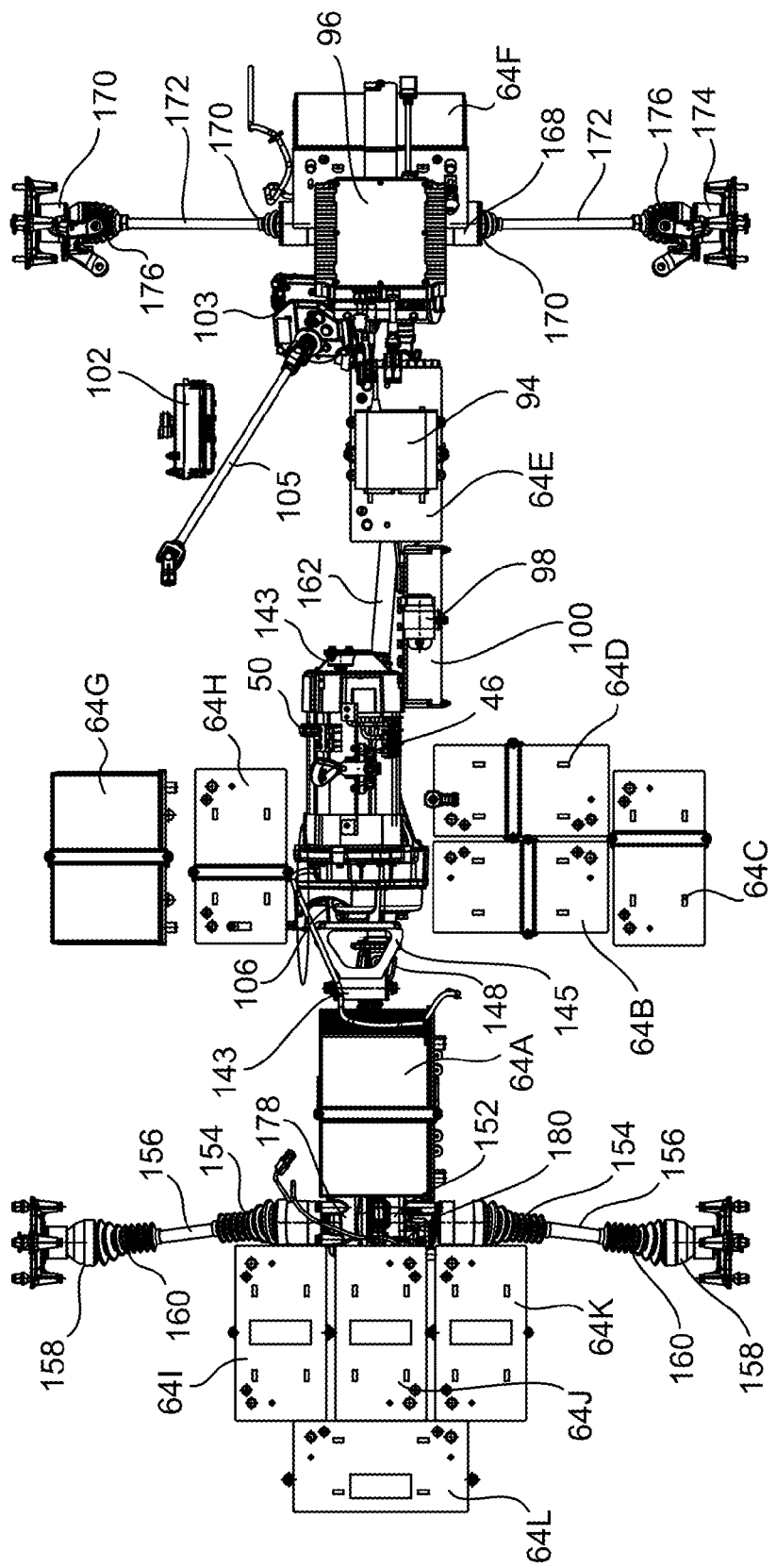
FIG. 19 is a top plan view of the power train of the RUV of FIG. 17.
Figure 20:
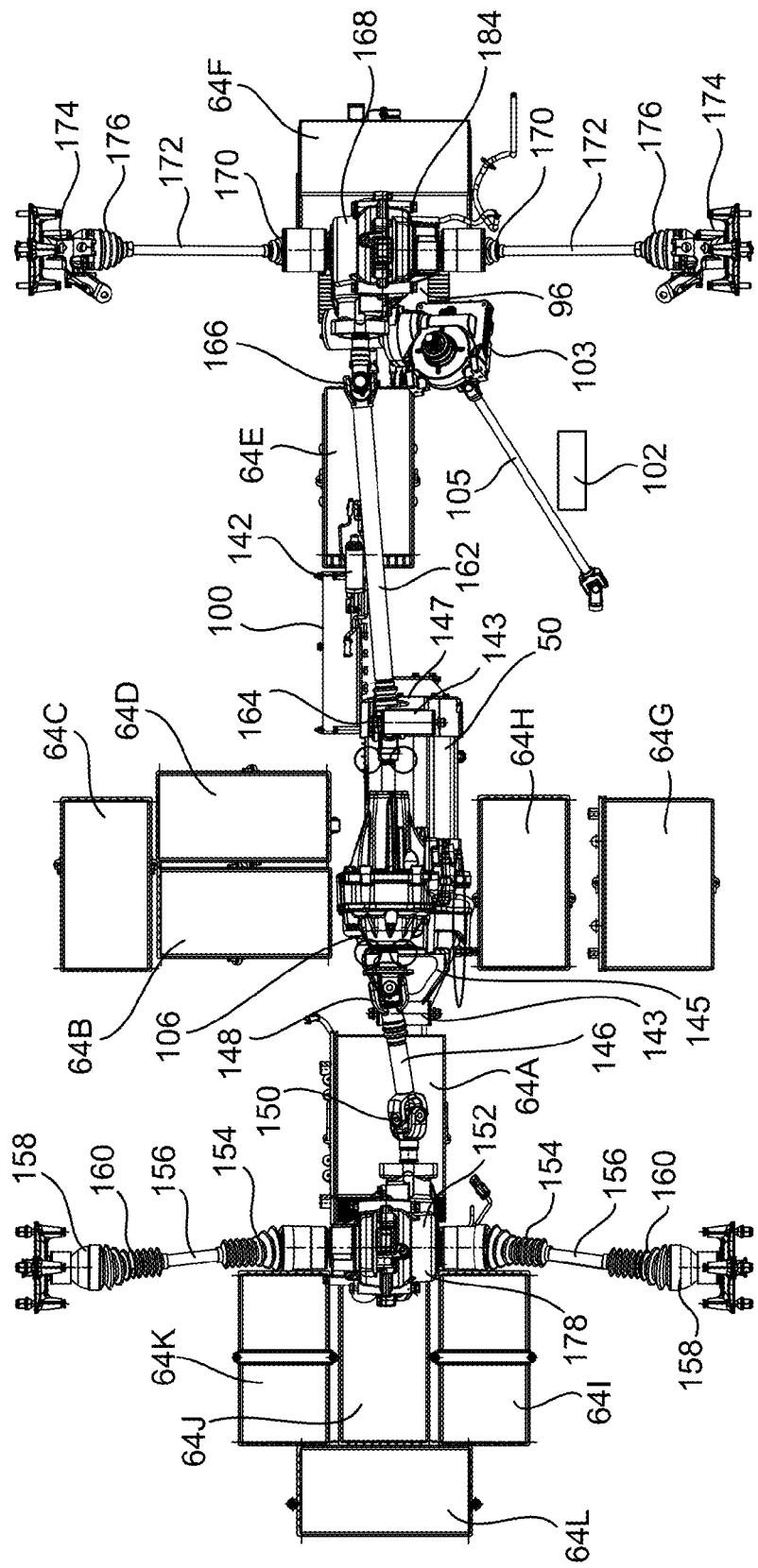
FIG. 20 is a bottom plan view of the power train of FIG. 19.
Figure 21:
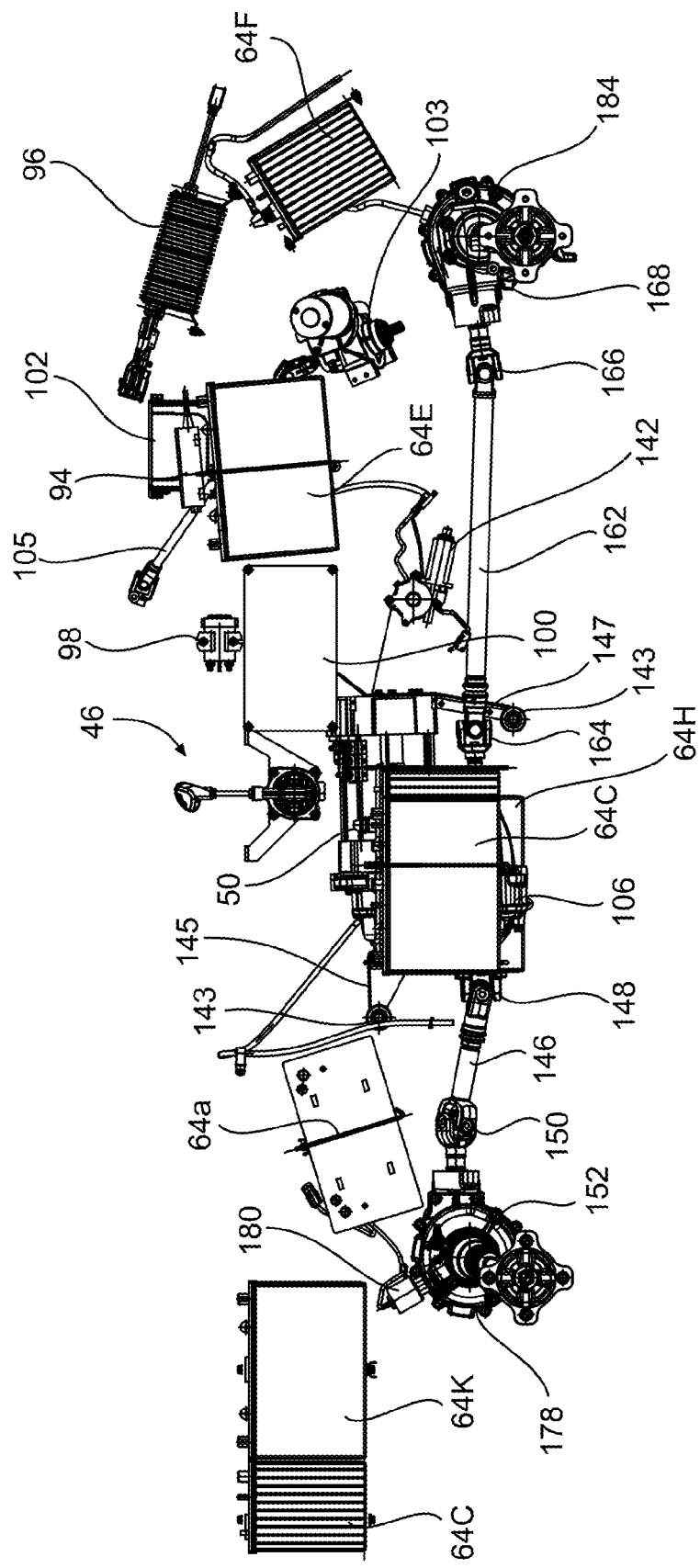
FIG. 21 is a bottom plan view of the power train of FIG. 19.

In the RUV 10' illustrated in FIGS. 17 to 21, the batteries 64A to 64D are disposed in the same location as in the RUV 10 described above and are electrically connected together in series. The battery 64E is in the central cooling tunnel at a position closer to the front of the RUV 10' than the position of the battery 64E in the RUV 10 described above. The battery 64E is also slightly slanted in the RUV 10' as can be seen in FIG. 21. As can be seen in FIG. 21, when viewed from the right side of the RUV 10', the battery 64E overlaps the steering column 105. The battery 64F is disposed at the front of the RUV 10' and is slanted as can be seen in FIG. 21. The geometric center of the battery 64F is disposed forwardly of the front drive axles 172. The batteries 64E and 64F are located laterally such that the vertical plane containing the longitudinal centerline of the RUV 10' passes through the batteries 64E and 64F. The batteries 64G and 64H are disposed in the same location as in the RUV 10 described above. The batteries 64E to 64H are electrically connected together in series. As can be seen in FIG. 18, in the RUV 10' the batteries 64I to 64L are disposed in the lower cargo space 84 of the cargo box 11. The batteries 64I to 64K are disposed side-by-side near the front of the cargo box 11, with the battery 64I being on the left, the battery 64K being on the right and the battery 64J laterally between the batteries 64I and 64K. The battery 64L is disposed behind the batteries 64I to 64K and is generally laterally centered with respect to the batteries 64I to 64K. The battery 64L is also oriented perpendicularly relative to the batteries 64I to 64K. The batteries 64I to 64K are electrically connected together in series.

Positioning the batteries 64E and 64F as shown in FIGS. 17 to 21 creates a space that accommodates a power steering unit 103. As best seen in FIG. 21, the power steering unit 103 is disposed rearwardly of the battery 64F and forwardly of the geometric center of the battery 64E. As best seen in FIG. 20, the power steering unit 103 is located laterally such that the vertical plane containing the longitudinal centerline of the RUV 10' passes through the power steering unit 103. The power steering unit 103 is connected to the steering wheel of the steering device 16 via the steering column 105. Steering rods (not shown) connect the power steering unit 103 to the two front wheels 14 so as to transfer the steering motion from the steering device 16 to the two front wheels 14. The power steering unit 103 is an electrical power steering unit 103, but other types, such as hydraulic power steering units for example, are contemplated.

In the RUV 10', the three battery packs (i.e. batteries 64A to 64D, batteries 64E to 64H, and batteries 64I to 64L) are electrically connected in parallel to the BMS 94. The BMS 94 is mounted to the frame 12 above the battery 64E and forwardly of the electric motor 50. The BMS 94 is electrically connected to the charger 96. The charger 96 is mounted to the frame 12 above the battery 64F and forwardly of the BMS 94. The three battery packs (i.e. batteries 64A to 64D, batteries 64E to 64H, and batteries 64I to 64L) are also electrically connected in parallel to the relay 98 disposed in the central cooling tunnel forwardly of the electric motor 50 and behind the battery 64E. The relay 98 is electrically connected to the MCM 100. The MCM 100 is electrically connected to the electric motor 50 and to the VCM 102. As shown in FIGS. 19 to 21, the MCM 100 is mounted in the central cooling tunnel above and to the right of the electric motor 50, behind the battery 64E and below the relay 98. The geometric center of the MCM 100 is disposed forwardly of the electric motor 50. As shown in FIGS. 19 to 21, the VCM 102 is disposed on the left side of the RUV 10' forwardly and vertically higher than the electric motor 50 and longitudinally between the charger 96 and the MCM 100. The VCM 102 is disposed forwardly of the steering wheel of the steering device 16.

FIGS. 13 to 15 and 22 to 29 will now be described with respect to the RUV 10. Except where specifically indicated below, this description also applies to the RUV 10' illustrated in FIGS. 17 to 21.

Figure 22:
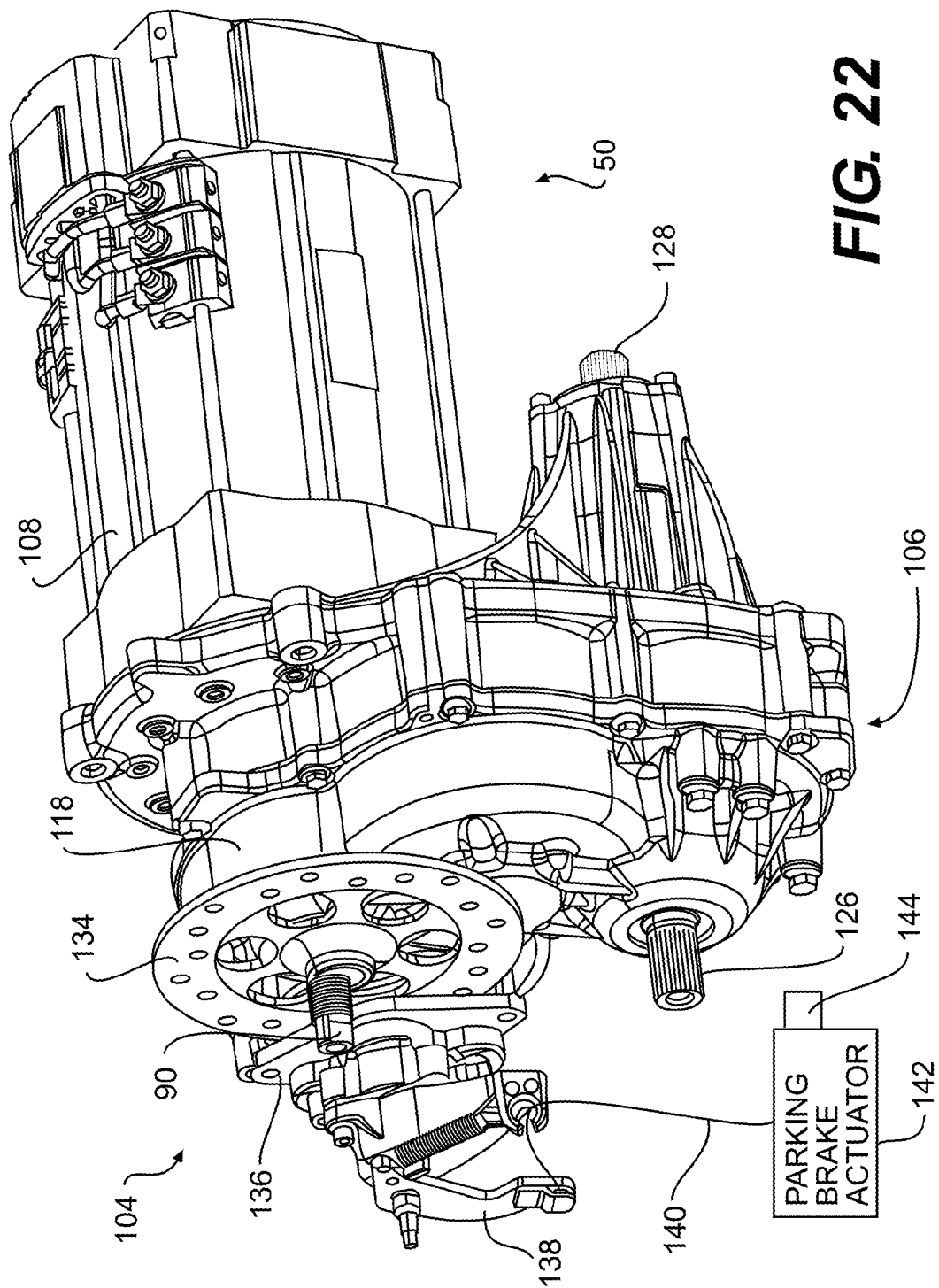
FIG. 22 is a perspective view, taken from a rear, right side, of an electric motor of the RUV of FIG. 1.
Figure 23:
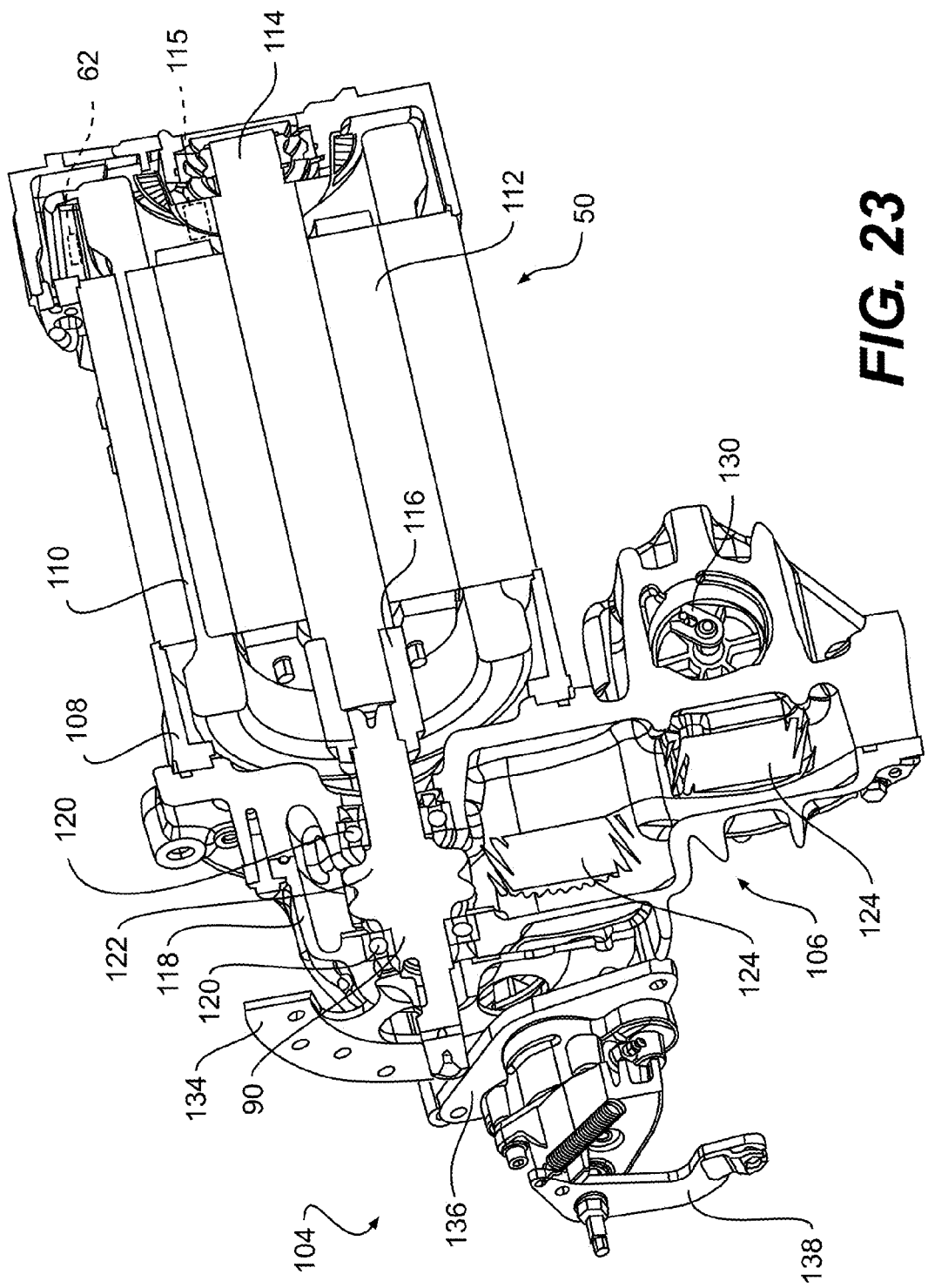
FIG. 23 is a longitudinal cross-section of the electric motor of FIG. 22.

Turning now to FIGS. 22 and 23, the electric motor 50, an associated parking brake 104 and an associated reduction drive 106 will be described. As described above, the electric motor 50 is a three-phase AC-induction motor having a rated voltage of 29 volts. The electric motor 50 has a motor casing 108. A fixed stator 110 is disposed inside the casing 108. The stator 108 defines four poles. Each of the four poles has three salient poles (one per phase) with wires wound around them. A rotor 112 is disposed inside the stator 110. The rotor 112 has a number of wire windings. A rotor shaft 114 is connected to the rotor 112 for rotation therewith. To turn the rotor 112, and therefore the rotor shaft 114, current is applied to the windings of the stator 110 to create a rotating magnetic field. The rotating magnetic field induces a current in the windings of the rotor 112, which as a result generates a magnetic field. The interaction between the magnetic field of the stator 110 and the magnetic field of the rotor 112 causes the rotor 112 to turn. A difference in the speed of rotation of the magnetic field generated by the stator 110 and the speed of rotation of the rotor 112 is known as slip. By controlling a magnitude and frequency of the current applied to the windings of the stator 110 and by controlling the amount of slip, it is possible to control a speed of rotation of the rotor shaft 114 and the amount of torque generated by the electric motor 50. A motor speed sensor 115, schematically shown in FIG. 23, senses a speed of rotation of the rotor shaft 114. The output shaft 90 is coaxial with the rotor shaft 114. The output shaft 90 is connected to the rotor shaft 114 by a coupling 116 such that the output shaft 90 rotates at the same speed as the rotor shaft 114. As such, it is contemplated that the motor speed sensor 115 could sense a speed of rotation of the output shaft 90. It is contemplated that the output shaft 90 could be integrally formed with the rotor shaft 114.

As seen in FIG. 23, the output shaft 90 extends through a housing 118 of the reduction drive 106. The housing 118 of the reduction drive 106 is fastened to the motor casing 108 on a rear side of the electric motor 50. The output shaft 90 is rotationally supported in the housing 118 by bearing 120. The output shaft 90 has a gear 122 formed thereon that is disposed between the bearings 120. It is contemplated that the gear 122 could be formed independently of the output shaft 90 and be connected to the output shaft 90 via splines for example. The gear 122 of the output shaft 90 drives a plurality of gears 124 disposed inside the housing 118, some of which are shown in FIG. 23. The gear 122 and the gears 124 interact such that a speed of rotation at an output of the reduction drive 106 is less than a speed of rotation of the output shaft 90. Since the speed reduction ratio provided by the reduction drive 106 is fixed, it is contemplated that the motor speed sensor 115 could sense a speed of rotation of any one of the shafts onto which the gears 124 are mounted in order to determine a speed of rotation of the rotor shaft 114. It is contemplated that the reduction drive 106 could provide a variable speed reduction ratio. As can be seen in FIG. 22, two reduction drive shafts 126, 128 extend from the lower portion of the housing 118. The rear shaft 126 is permanently connected to the last gear of the reduction drive 106 and as such always rotates when the rotor shaft 114 is turning. The front shaft 128 is selectively connected to the last gear of the reduction drive 106 and as such only rotates when it is connected to this last gear and the rotor shaft 114 is turning. A two-wheel drive/four-wheel drive (2WD/4WD) selector 130 disposed in the housing 118 of the reduction drive 106 connects and disconnects the front shaft 128 from the gears 124 of the reduction drive 106. The 2WD/4WD selector 130 is an electric actuator having two positions. In one position, the shaft 128 is disconnected, and in the other position, the shaft 128 is connected to the drive shaft 126. The position of the 2WD/4WD selector 130 is controlled by a 2WD/4WD switch 132 (FIG. 26) located in the cockpit area 22 that is manually actuated by the driver of the vehicle 10. As will be described below, under some conditions, the VCM 102 can send a signal to the 2WD/4WD selector 130 overriding a signal from the 2WD/4WD switch 132 to move the 2WD/4WD selector 130 to a position other than the one selected by the 2WD/4WD switch 132.

The parking brake 104 is mounted on the portion of the output shaft 90 that extends outside of the housing 118 of the reduction drive 106. As such, and as can be seen, the parking brake 104 is disposed rearwardly of the electric motor 50. The parking brake 104 is a disk brake assembly including a brake disk 134 and a brake caliper 136. The brake disk 134 is connected to the output shaft 90 so as to be rotationally fixed thereon. Therefore, the brake disk 134 rotates with the output shaft 90 and when the parking brake 104 is engaged, the parking brake 104 prevents the rotor shaft 114 and any one of the wheels 14 operatively connected to the electric motor 50 from turning. The brake caliper 136 is connected to a rotatable lever 138. The lever 138 is connected to a cable 140, schematically shown in FIG. 22. The cable 140 is connected to a cam (not shown) driven by an electric motor 142, schematically shown in FIG. 22, and shown in FIG. 21. By having the motor 142 turn the cam in a first direction, the cable 140 pulls on the lever 138. Pulling on the lever 138 causes the brake caliper 136 to clamp the brake disk 134 thus engaging the parking brake 104 by preventing rotation of the brake disk 134. A parking brake switch 144 (schematically shown) associated with the cam, senses a position of the cam to determine if the parking brake 104 is disengaged. It is contemplated that other types of parking brakes could be used.

Figure 24:
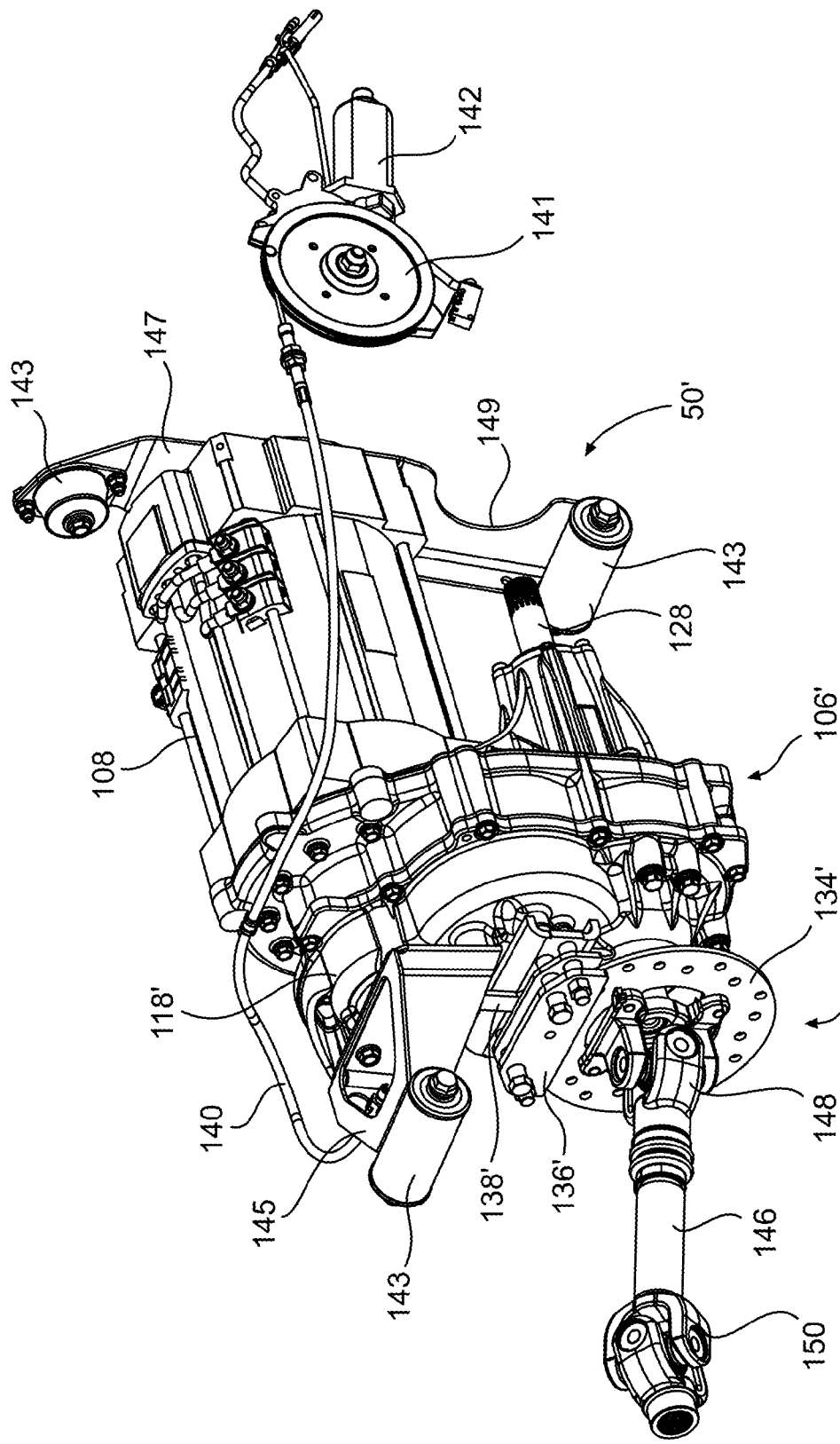
FIG. 24 is a perspective view, taken from a rear, right side, of an alternative embodiment of an electric motor of the RUV of FIG. 1.
Figure 25:
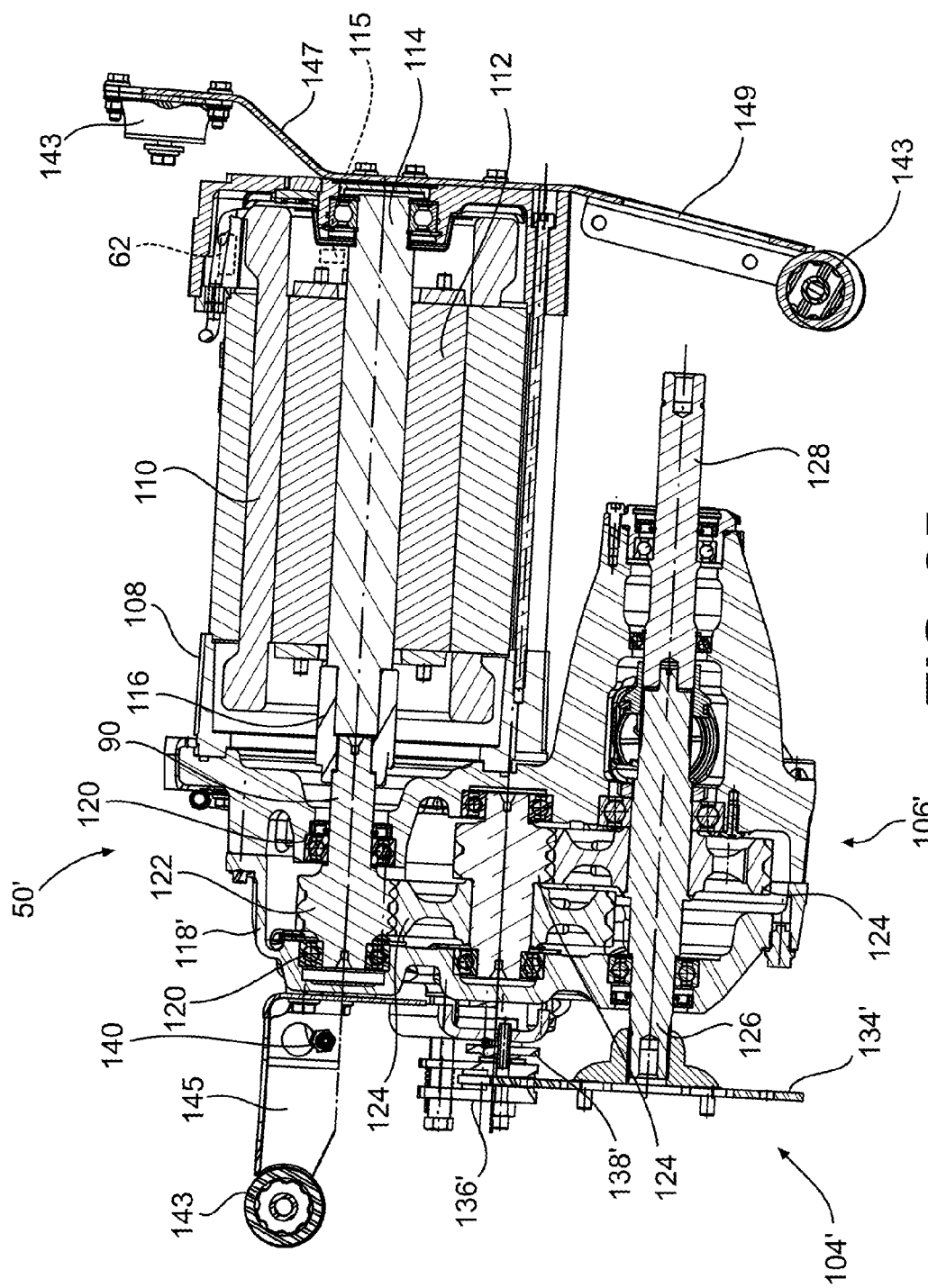
FIG. 25 is a longitudinal cross-section of the electric motor of FIG. 24.

FIGS. 24 and 25 illustrate an electric motor 50' that is an alternative embodiment of the electric motor 50 which can be used in the RUV 10 and the RUV 10'. The electric motor 50' is a three-phase AC-induction motor having a rated voltage of 29 volts like the electric motor 50, but the parking brake 104' is mounted on the rear shaft 126 of the reduction drive 106' instead of on the output shaft 90 as in the electric motor 50. For simplicity, elements of the electric motor 50' that are similar to those of the electric motor 50 have been labeled with the same reference numeral and will not be described again in detail.

The reduction drive 106' of the electric motor 50' is the same as the reduction drive 106 of the electric motor 50 except that the housing 118' of the reduction drive 106' is not provided with an aperture near a top thereof since in the electric motor 50' the output shaft 90 does not protrude through the housing 118' as can be seen in FIG. 25. The parking brake 104' is mounted to the portion of the rear shaft 126 that extends outside of the housing 118' of the reduction drive 106'. As such, and as can be seen, the parking brake 104' is disposed rearwardly of the electric motor 50'. The parking brake 104' is a disk brake assembly including a brake disk 134' and a brake caliper 136'. The brake disk 134' is connected to the rear shaft 126 so as to be rotationally fixed thereon. Therefore, the brake disk 134' rotates with the rear shaft 126 and when the parking brake 104' is engaged, the parking brake 104' prevents the rotor shaft 114 and any one of the wheels 14 operatively connected to the electric motor 50' from turning. The brake caliper 136' is connected to a rotatable lever 138'. The lever 138' is connected to a cable 140. The cable 140 is connected to a wheel 141 driven by an electric motor 142. By having the motor 142 turn the wheel 141 in a first direction, the cable 140 pulls on the lever 138'. Pulling on the lever 138' causes the brake caliper 136' to clamp the brake disk 134' thus engaging the parking brake 104' by preventing rotation of the brake disk 134'. As can be seen, the universal joint 148 is fastened to the brake disk 134'.

The electric motor 50' is provided with three motor mounts 143 to connect the electric motor 50' to the frame 12. It is contemplated that only two or more than three motor mounts 143 could be provided. Two of the motor mounts 143 are disposed at the front of the electric motor 50' and one of the motor mounts 143 is disposed at the rear of the electric motor 50'. The bracket 145 connecting the rear motor mount 143 to the rear of the electric motor 50' also houses the upper portion of the lever 138', a portion of the cable 140 and the connection therebetween. The bracket 147 connecting the front motor mounts 143 to the front of the electric motor 50' defines a semi-circular recess 149 to permit the passage of the front driveshaft 162. The motor mounts 143 are rubber dampers that reduce the transmission of vibration between the electric motor 50' and the frame 12. Although not shown, the electric motor 50 is also provided with three motor mounts similar to the ones of the electric motor 50'. However, the position of the rear motor mount of the electric motor 50 differs from the position of the rear motor mount 143 of the electric motor 50' so as not to interfere with the parking brake 104 of the electric motor 50.

Figure 15:
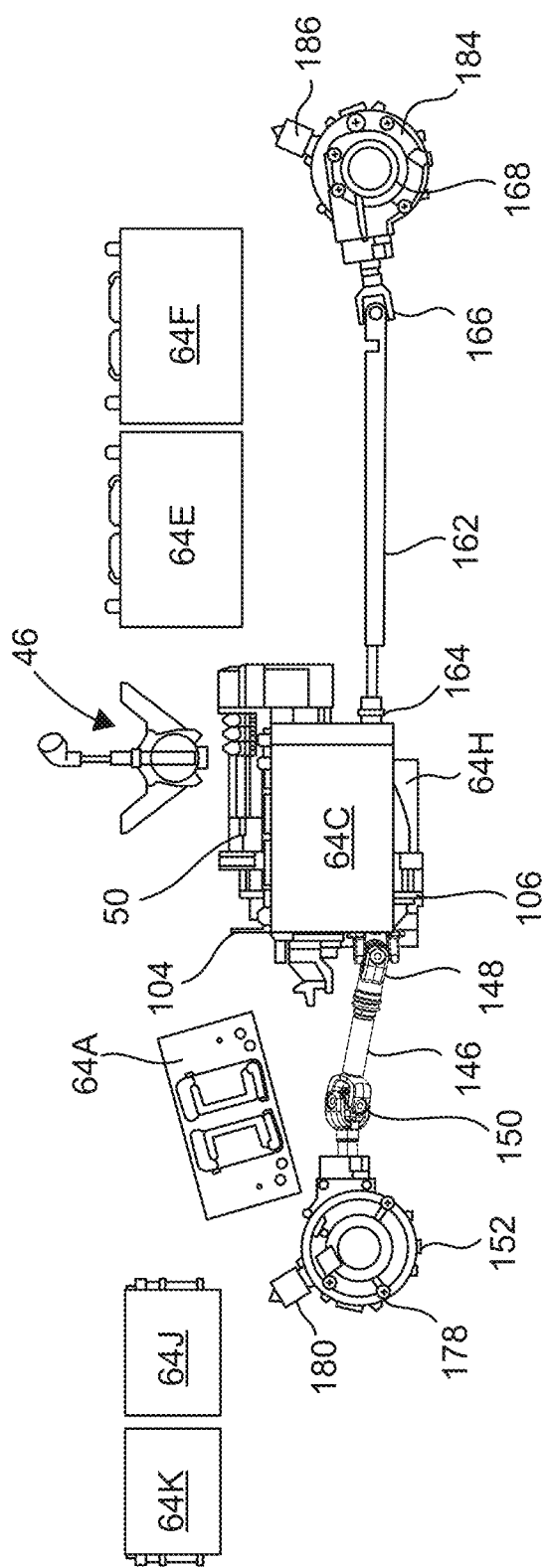
FIG. 15 is a right side elevation view of the power train of FIG. 13.

With reference to FIGS. 13 to 15, the power train of the vehicle 10 will now be described.

A rear driveshaft 146 connects to and is driven by the rear shaft 126 of the reduction drive 106 via a universal joint 148. As such, the rear driveshaft 146 is always driven by the electric motor 50 when the electric motor 50 is operating. From the universal joint 148, the rear driveshaft 136 extends rearwardly and toward the left of the vehicle 10 to another universal joint 150. The universal joint 150 connects the rear driveshaft 146 to a rear gear assembly 152, described in greater detail below. The rear gear assembly 152 connects, via universal joints disposed inside flexible boots 154, to left and right rear drive axles 156. The rear drive axles 156 are connected to spindles 158 of the rear wheels 14 via universal or constant velocity joints disposed inside flexible boots 160.

A front driveshaft 162 connects to and is driven by the front shaft 128 of the reduction drive via a universal joint 164. As such, the front driveshaft 162 is only driven by the electric motor 50 when the electric motor 50 is operating and when the 2WD/4WD selector 130 connects the shaft 128 to the gears 124 of the reduction drive 106. From the universal joint 164, the front driveshaft 162 extends forwardly and toward the right of the vehicle 10 to another universal joint 166. The universal joint 166 connects the front driveshaft 162 to a front gear assembly 168, described in greater detail below. The front gear assembly 168 connects, via universal joints disposed inside flexible boots 170, to left and right front drive axles 172. The front drive axles 172 are connected to spindles 174 of the front wheels 14 via universal or constant velocity joints disposed inside flexible boots 176.

Figure 16:
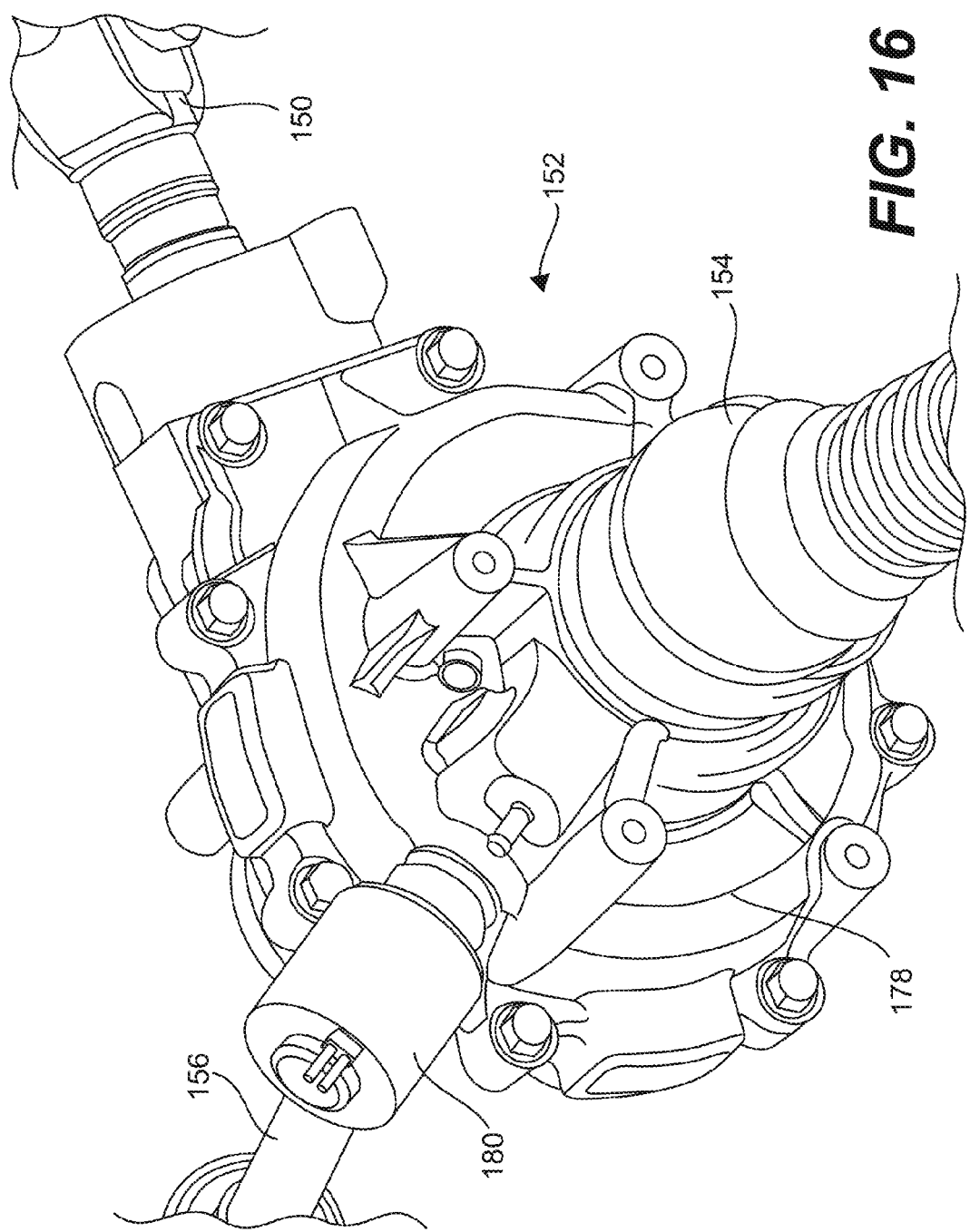
FIG. 16 is perspective view, taken from a rear, right side, of a rear differential of the power train of FIG. 13.
Figure 17:
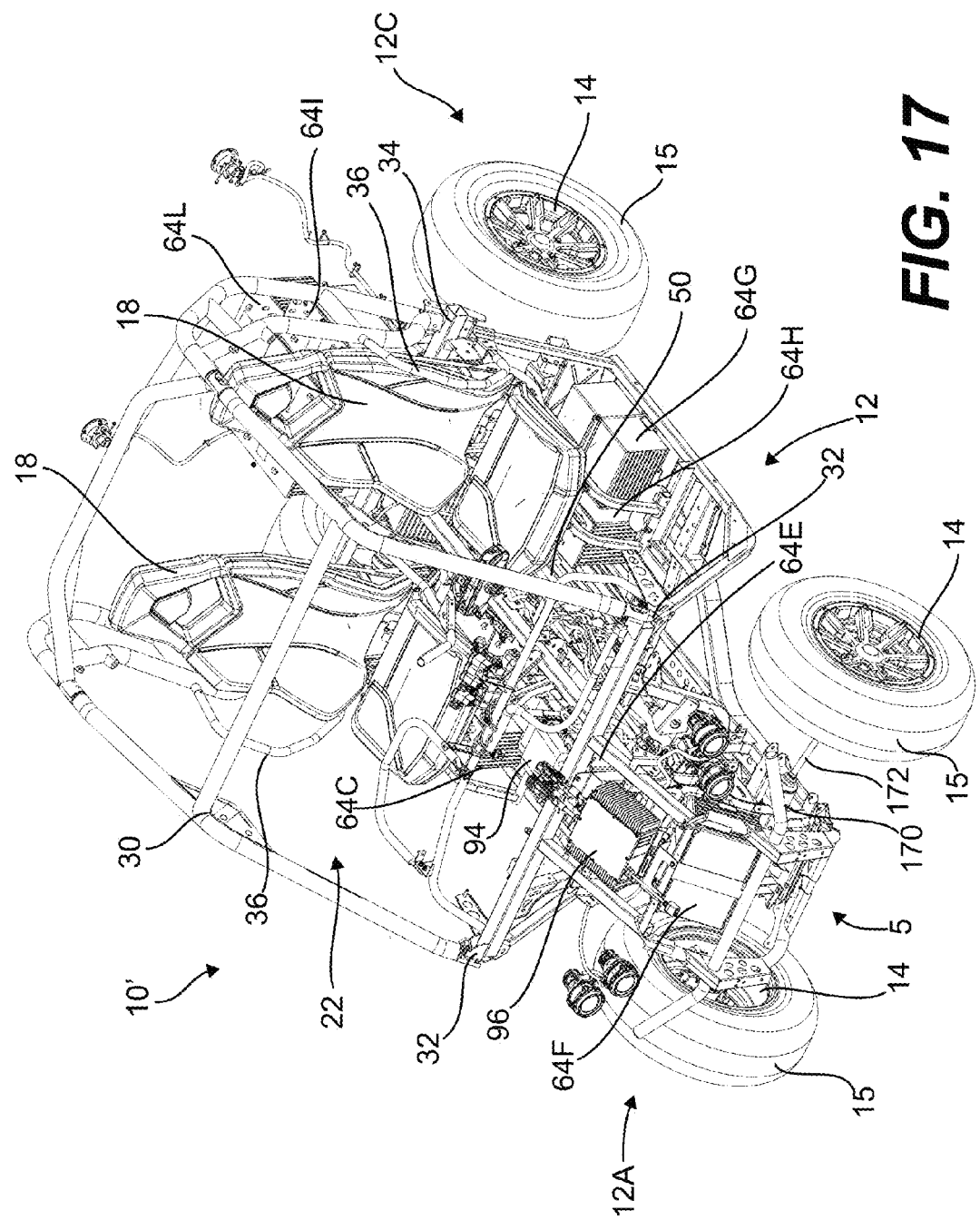
FIG. 17 is a perspective view, taken from a front, left side, of the RUV of FIG. 1 having an alternative arrangement of the batteries and components of the electrical system, with fairings and other elements removed for clarity.

Turning now to FIG. 16, the rear gear assembly 152 will be described. The rear gear assembly 152 has a rear gear assembly housing 178. As can be seen in FIG. 15, the rear portion of the battery 64A is vertically above the housing 178 and is longitudinally between the front and rear ends of the housing 178. Inside the housing 178, two bevel gears (not shown) engage each other to transmit the rotation of the universal joint 150 to one of the rear drive axles 156. The bevel gears are selected such that a speed of rotation of this rear drive axle 156 is less than a speed of rotation of the universal joint 150. As such, this rear drive axle 156 and its associated wheel 14 is always driven by the electric motor 50 when the electric motor 50 is operating. The other rear drive axle 156 is selectively connected to the above rear drive axle 156 by a rear axles lock actuator 180. When the rear drive axles 156 are connected together by the rear axles lock actuator 180, both rear drive axles 156 rotate together at the same speed. When the rear drive axles 156 are disconnected from each other by the rear axles lock actuator 180, the rear drive axles 156 rotate independently from each other. The rear axles lock actuator 180 is controlled by a rear axles lock switch 182 (FIG. 26) located in the cockpit area 22 that is manually actuated by the driver of the vehicle 10. As will be described below, under some conditions, the VCM 102 can send a signal to the rear axles lock actuator 180 overriding a signal from the rear axles lock switch 182 to move the rear axles lock actuator 180 to a position other than the one selected by the rear axles lock switch 182. The rear axles lock actuator 180 is normally biased toward a position connecting the rear drive axles 156 together. Therefore, when no current is applied to the rear axles lock actuator 180, such as when the vehicle 10 is shut down, the rear drive axles 156 are connected to each other. It is contemplated that the rear gear assembly 152 could be a locking differential.

The front gear assembly 168 is similar to the rear gear assembly 152. The front gear assembly 168 has a front gear assembly housing 184. As can be seen in FIG. 15, the battery 64E is vertically above the housing 184 and is longitudinally between the electric motor 50 and the housing 184. Inside the housing 184, two bevel gears (not shown) engage each other to transmit the rotation of the universal joint 166 to one of the front drive axles 172. The bevel gears are selected such that a speed of rotation of this front drive axle 172 is less than a speed of rotation of the universal joint 166. The other front drive axle 172 is selectively connected to the above front drive axle 172 by a front axles lock actuator 186. When the front drive axles 172 are connected together by the front axles lock actuator 186, both front drive axles 172 rotate together at the same speed. When the front drive axles 172 are disconnected from each other by the front axles lock actuator 186, the front drive axles 172 rotate independently from each other. The front axles lock actuator 186 is controlled by a front axles lock switch 188 (FIG. 26) located in the cockpit area 22 that is manually actuated by the driver of the vehicle 10. As will be described below, under some conditions, the VCM 102 can send a signal to the front axles lock actuator 186 overriding a signal from the front axles lock switch 188 to move the front axles lock actuator 186 to a position other than the one selected by the front axles lock switch 188. The front axles lock actuator 186 is normally biased toward a position connecting the front drive axles 172 together. Therefore, when no current is applied to the front axles lock actuator 186, such as when the vehicle 10 is shut down, the front drive axles 172 are connected to each other. It is contemplated that the front gear assembly 152 could be a locking differential.

It is contemplated that the front axle lock switch 188 could be omitted and that the front axles lock actuator 186 could instead be controlled by a position of the 2WD/4WD switch 132. In such an embodiment, when the 2WD/4WD switch 132 is at a position where the front driveshaft 162 is not driven by the electric motor 50, the front axles lock actuator 186 disconnects the front drive axles 172 from each other and when the 2WD/4WD switch 132 is at a position where the front driveshaft 162 is driven by the electric motor 50, the front axles lock actuator 186 connects the front drive axles 172 together. It is also contemplated that the rear and front axles lock switches 182, 188 could be replaced by a single three-position switch. In a first position, all drive axles 156, 172 are disconnected from each other. In a second position, only the rear drive axles 156 are connected to each other. In a third position, the rear drive axles 156 are connected to each other and the front drive axles 172 are connected to each other.

The RUV 10' is not provided with a front axles lock actuator 186 and therefore is also not provided with a front axles lock switch 188. As such, in the RUV 10' the front drive axles 172 are always disconnected from each other and therefore always rotate independently from each other. It is contemplated that the actuator 186 and switch 188 could be provided in the RUV 10'.

Figure 26:
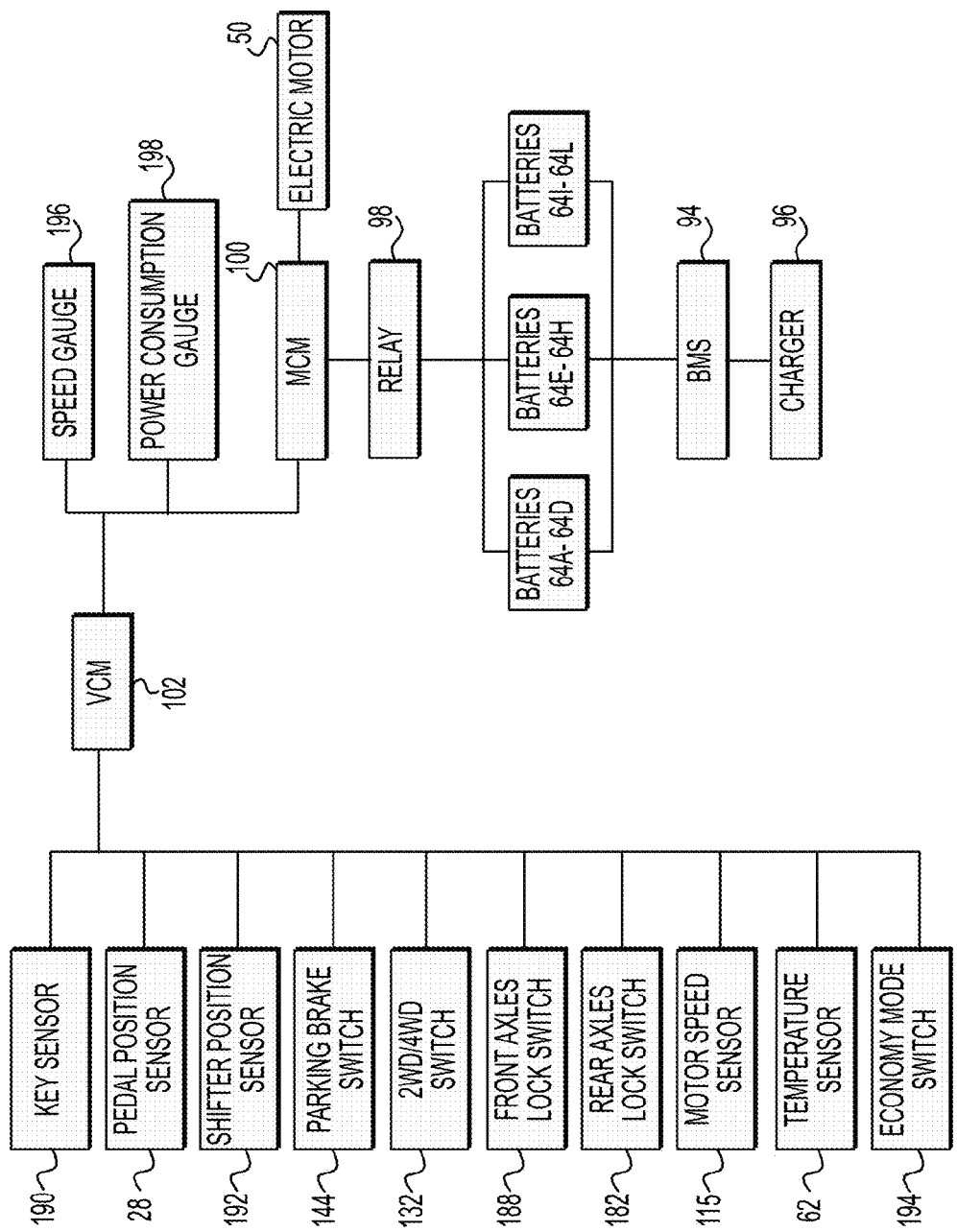
FIG. 26 is a schematic representation of an electrical system of the RUV of FIG. 1.

Turning now to FIG. 26, the electrical system of the RUV 10 will be described in greater detail. The batteries 64A to 64L are charged by plugging the charger 96 to a 120 volt AC source. The charger 96 includes an AC to DC converter to convert the 120 volt alternative current to a 48 volt direct current corresponding to the voltage of each battery pack (four batteries of 12 volt each). The 48 volt DC is routed to the BMS 94, which monitors the status of each battery pack and supplies the 48 volt DC to the battery packs to be charged. The charger 96 includes an interlock (not shown) that causes the relay 98 to be opened when the charger 96 is plugged to a 120 volt AC source, thus preventing current to be sent to the MCM 100, the electric motor 50 and other components electrically downstream of the relay 98, and therefore preventing the RUV 10 to be driven when the charger 96 is plugged. Although not shown, the charger 96 is also electrically connected to the various sensors, the VCM 102, and other low voltage electrical components to supply them with power from the battery packs. To do this, the charger 96 includes a DC to DC converter that reduces the 48 volt DC from the battery packs to the 13.5 volt DC used by these components.

In addition to the previously described sensors, the RUV 10 is also provided with a key sensor 190 and a shifter position sensor 192. The key sensor 190 senses whether a key is present or not to determine if the vehicle 10 should be started up or shut down. The vehicle 10 can be started up upon detection of the presence of a key, or can be started up upon the actuation of a starter switch when the presence of a key is detected. In one embodiment, the key and key sensor 190 employ Bombardier Recreational Products Inc.'s D.E.S.S.™ technology. As a result, the key sensor 190 not only senses if the key used is authorized for starting up the vehicle 10, but can also read information from the key as to any operational limitations of the vehicle 10 (i.e. maximum speed and/or acceleration) associated with the key. It is contemplated that the key sensor 190 could be replaced with a mechanical key assembly that acts as a switch to close a circuit when the key is turned. The shifter position sensor 192 senses a position of the shifter 46 as will be described in greater detail below.

In addition to the previously described switches, the RUV 10 is also provided with an economy mode switch 194. As will be described in greater detail below, when the economy mode switch 194 is activated, the maximum speed of the vehicle 10 and the maximum torque provided by the electric motor 50 are limited in order to improve the energy consumption efficiency of the vehicle 10.

The VCM 102 receives signals from the various sensors and switches illustrated on the left side of FIG. 26 and uses these to operate the vehicle 10 accordingly. For example, the VCM 102 sends a signal to the 2WD/4WD selector 130 to move it to the position selected at the 2WD/4WD switch. In another example, the VCM 102 uses a signal from the parking brake switch 144 to determine if the parking brake 104 is disengaged.

The VCM 102 uses a signal from the motor speed sensor 115 to determine a speed of the vehicle 10. Since the gear reduction ratio from the rotor shaft 114 to the powered wheel(s) 14 of the vehicle 10 is fixed, there is a linear relationship between the speed of rotation of the rotor shaft 114 and the speed of the vehicle 10. The VCM 102 sends a signal to a speed gauge 196 disposed in the cockpit area 22. The speed gauge 196 displays the speed of the vehicle 10 to the driver. The speed gauge 196 also displays other information related to the RUV 10 to the driver.

The VCM 102 uses signals from the pedal position sensor 28, the shifter position sensor 192, the motor speed sensor 115 and the economy mode switch 194 to determine a speed at which the electric motor 50 should turn the rotor shaft 114 and the rate at which it should accelerate to this speed. The signal from the pedal position sensor 28 indicates to the VCM 102 the speed at which the driver wants the vehicle 10 to go. From the signal from the shifter position sensor 192 the VCM 102 determines if the electric motor 50 should be running or not, and if so in which direction it should turn the rotor shaft 114 and if any limitation on the speed, acceleration and torque should be applied as will be described in greater detail below. The signal from the motor speed sensor 115 is sent to the MCM 100. The MCM 100 determines the speed of the electric motor 50 based on this signal and sends a signal indicative of this speed to the VCM 102 which uses it as a feedback to determine if the electric motor 50 is operating as desired. The signal from the economy mode switch 104 indicates to the VCM 102 if an economy mode of operation of the electric motor 50 should be engaged as described in greater detail below. Based on these signals, the VCM 102 sends a signal to the MCM 100 as to the desired operation of the electric motor 50.

From the signal of the VCM 102, the MCM 100 determines the magnitude and frequency of the current to be supplied to the electric motor 50. The MCM 100 then generates this three-phase current from the batteries 64A to 64L and supplies it to the windings of the stator 110 to cause the rotor shaft 114 to turn.

When the vehicle 10 is in movement and the driver releases the accelerator pedal 20 completely, the MCM 100 stops supplying current to the windings of the stator 110. However, since the vehicle 10 is in movement, the rotor shaft 114 continues to turn due to its connection to at least one of the wheels 14. The rotor 112 therefore also continues to turn. By generating a magnetic field in the windings of the rotor 112, the rotation of the rotor 112 induces a current in the windings of the stator 110. This current is supplied to the batteries 64A to 64L to charge the batteries 64A to 64L. This is known as regeneration of the batteries 64A to 64L or "regen". It is contemplated that at least some of the wheels 14 could be provided with regenerative braking systems that also produce a current that can be used to recharge the batteries 64A to 64L when the brakes are applied.

In another embodiment, when the vehicle 10 is in movement and the driver releases the accelerator pedal 20 completely, the MCM 100 stops supplying current to the windings of the stator 110, the rotor shaft 114 continues to turn due to its connection to at least one of the wheels 14, the rotor 112 continues to turn thus generating a magnetic field as described above. However, instead of being controlled so as to maximize regen as in the embodiment above, the VCM 102 commands the output signal of the MCM 100 to control the electric motor 50 to create a resistance to the rotation of the rotor shaft 114, thus decelerating the vehicle 10. This can be referred to as motor braking. In this embodiment, the MCM 100 is not taking any action on when or how to apply the motor braking or regen, it is simply a slave to the VCM 102 and does the actions commanded by the VCM 102. Although some regen will occur, the control of the electric motor 50 is primarily based on obtaining this deceleration. It is also contemplated that the MCM 100 could itself decide to apply motor braking or regen at the same time as the VCM 102 commands the MCM 100 to apply motor braking and thus, the electric motor 50 would be required to create the sum of both commands.

In one example, the amount of motor braking applied by the electric motor 50 when the accelerator pedal 20 is completely released is based on the signal from the shifter position sensor 192. If the VCM 102 receives a signal from the shifter position sensor 192 that indicates that the shifter 46 is in a high position (described below), then the electric motor 50 applies a first amount of motor braking. If the VCM 102 receives a signal from the shifter position sensor 192 that indicates that the shifter 46 is in a low position (described below), then the electric motor 50 applies a second amount of motor braking that is greater than the first amount of motor braking. If the economy mode switch 194 is activated, regardless of whether the shifter 46 is in the high or low position, then the electric motor 50 applies a third amount of motor braking that is intermediate the first and second amounts of motor braking. It is contemplated that the first, second and third amounts of motor braking could vary based on one or more of vehicle speed, motor speed, motor temperature and battery voltage. It is also contemplated that, the amount of motor braking could be based only on one or more of vehicle speed, motor speed, motor temperature and battery voltage independently of the position of the shifter 46. It is also contemplated that if the VCM 102 receives a signal indicating that the brake pedal has been depressed, the amount of motor braking could be increased by a set amount depending on the position of the shifter 46 or increased progressively based on the actual position of the brake pedal.

The MCM 100 sends information regarding the battery current to the VCM 102. The VCM 102 calculates the current battery power consumption or regeneration, as the case may be. A signal representative of the current battery power consumption or regeneration, as the case may be, is sent from the VCM 102 to a power consumption gauge 198 disposed in the cockpit area 22. The power consumption gauge 198 displays the current battery power consumption or regeneration to the driver. It is contemplated that this signal could also be provided by the MCM 100 or the BMS 94. The power consumption gauge 198 also receives a signal from the BMS 94 indicative of the charge level of the batteries 64A to 64L. The power consumption gauge 198 displays the current charge level of the batteries 64A to 64L.

The various signals to and from the BMS 94, MCM 100, and VCM 102 are sent and received via controlled area network (CAN) buses. It is contemplated that other types of communication networks could be used, such as, but not limited to, vehicle area network (VAN), local interconnect network (LIN) and FlexRay.

A shutdown sequence of the RUV 10 will now be described. The shutdown sequence for the RUV 10' is the same as the one described below except that the front drive axles 172 always remain disconnected from each other since, as discussed above, the RUV 10' is not provided with a front axles lock actuator 186. This shutdown sequence occurs as soon as the key sensor 190 indicates that the key of the vehicle 10 has been removed. In alternative embodiments, the shutdown sequence could occur when the key is moved to an "off" position or when a "vehicle off" switch is activated. The shutdown sequence overrides any signal sent by the sensors and switches illustrated on the left side of FIG. 26, including the shifter position sensor 192. The shutdown sequence is considered to be entirely automatic as no action from the driver is necessary once the key has been removed. When the VCM 102 receives a signal from the key sensor 190 that the key has been removed, the VCM 102 sends a signal to the MCM 100 to stop supplying current to the electric motor 50 in order to interrupt the operation of the electric motor 50. The VCM 102 then sends a signal to the 2WD/4WD selector 130 to connect the front shaft 128, and therefore the front driveshaft 162, to the electric motor 50 via the reduction drive 106. The VCM 102 then stops supplying power to the rear and front axles lock actuators 180, 186, thus returning them to their default positions. As a result, the rear drive axles 156 are connected together and the front drive axles 172 are connected together. When the speed of the RUV 10 is below a predetermined speed, the VCM 102 finally sends a signal to the parking brake actuator 142 to engage the parking brake 104. The VCM 102 determines that the parking brake 104 has been engaged when the current used by the parking brake actuator 142 reaches a predetermined current. In one embodiment, the VCM 102 waits for a predetermined, non-zero, amount of time from the interrupted operation of the electric motor 50, two seconds for example, prior to sending the signal to engage the parking brake 104.

Upon start-up, when the key sensor 190 determines that a key is present, the VCM 102 moves the 2WD/4WD selector 130, the rear and front axles lock actuators 180, 186, and the parking brake actuator 142 to positions corresponding to that matching the signals received from the sensors and switches illustrated on the left side of FIG. 26 prior to resuming operation of the electric motor 50. As would be understood, in the RUV 10' the VCM 102 does not control the position of the front axles lock actuator 186 as the RUV 10' is not provided with the actuator 186.

Figure 27:
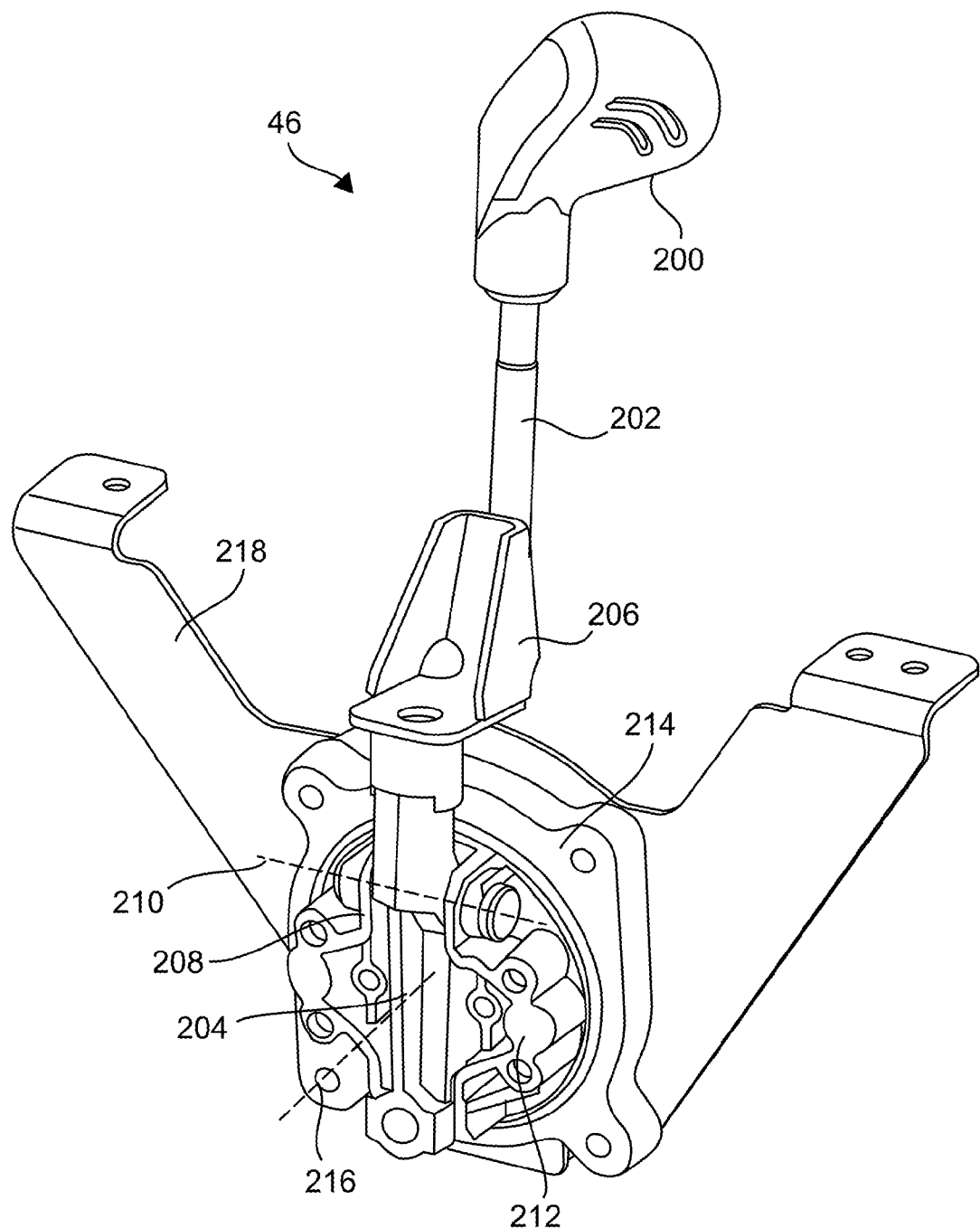
FIG. 27 is a perspective view, taken from a front, left side of a shifter of the RUV of FIG. 1.
Figure 28:
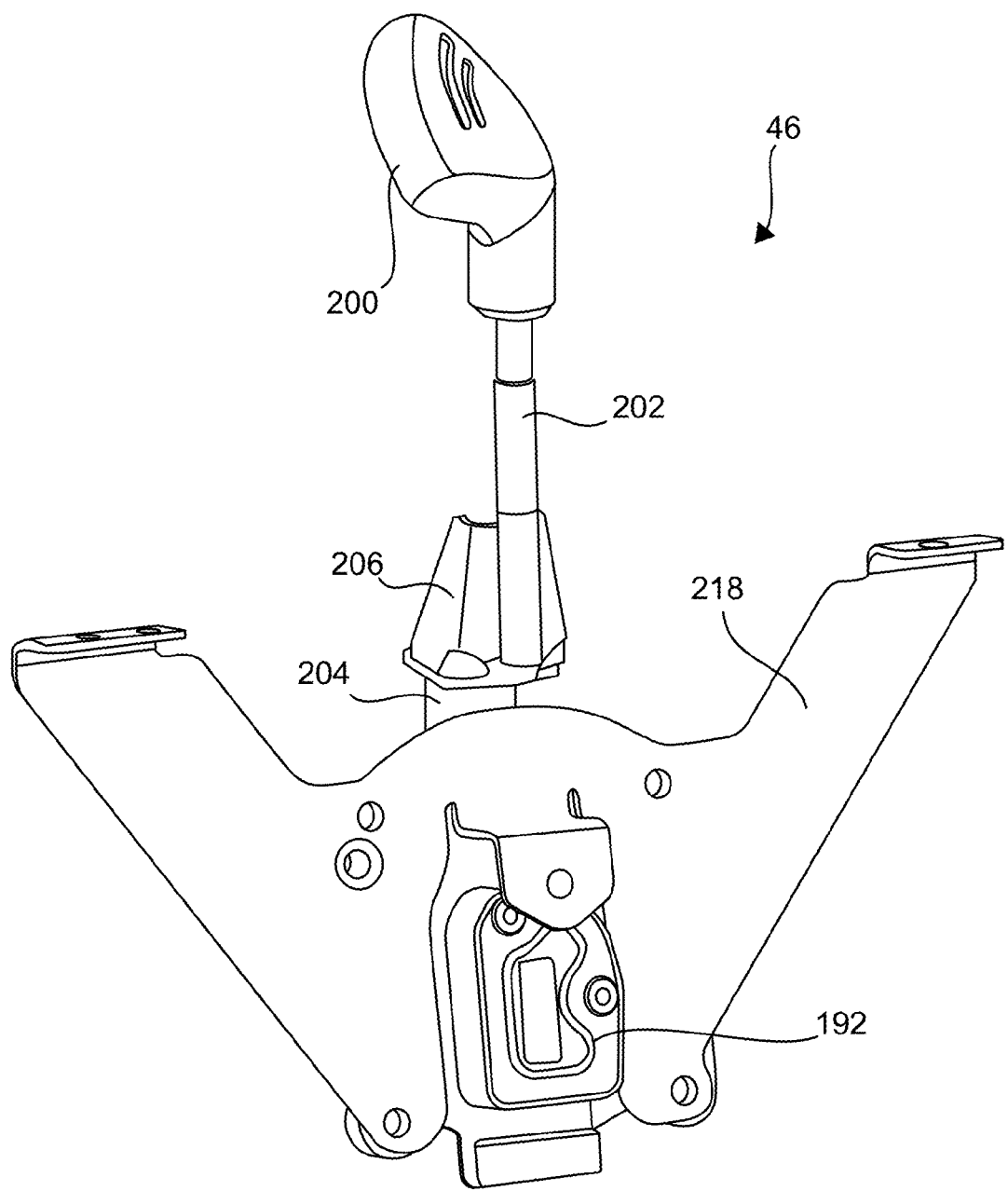
FIG. 28 is a perspective view, taken from a front, right side of the shifter of FIG. 27.
Figure 29:
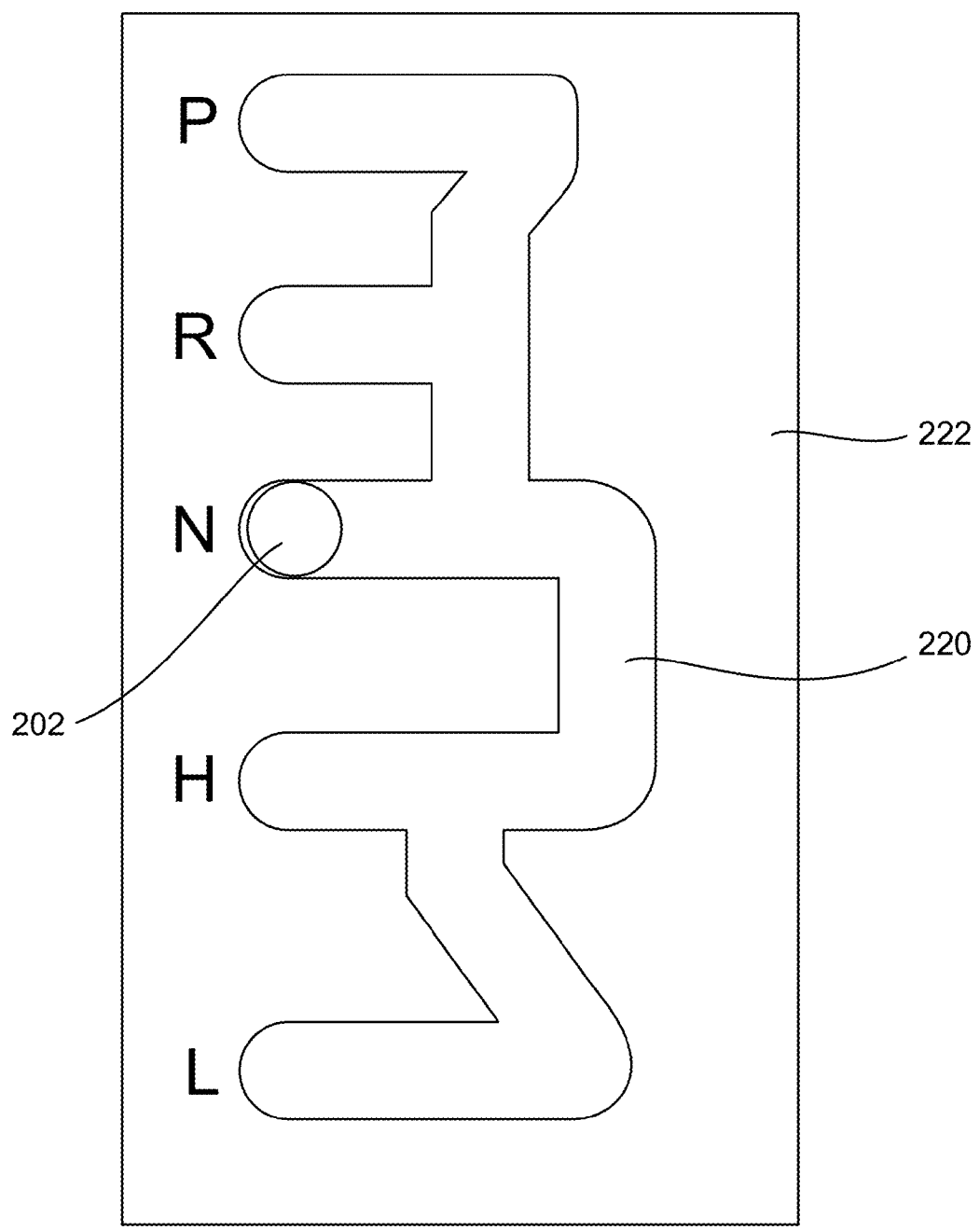
FIG. 29 is a schematic illustration of a shifter plate defining a shift pattern of the shifter of FIG. 27.

Turning to FIGS. 27 to 29, the shifter 46 will now be described in more detail. The shifter 46 includes a knob 200 mounted on the end of a lever 202. The lever 202 is connected to a shaft 204 via a bracket 206. The shaft 204 is pivotally connected to a bracket 208 so as to pivot about an axis 210. The axis 210 is generally parallel to the longitudinal centerline 68 of the vehicle 10. The bracket 208 is integrally formed with a cylindrical body 212. The cylindrical body 212 is pivotally connected inside a housing 214 so as to pivot about an axis 216. The axis 216 is generally perpendicular to the axis 210 and to a vertical plane containing the longitudinal centerline 68 of the vehicle 10. The housing 214 is mounted to one side of a bracket 218. The shifter position sensor 192 is mounted to the other side of the bracket 218. The bracket 218 connects the shifter 46 to the console 23.

The lever 202 extends through and is received in a slot 220 defined in a shifter plate 222 (FIG. 29). The slot 220 defines a shift pattern of the shifter 46. As can be seen, the slot 220 defines a plurality of discrete shifter positions (P, R, N, H, L). It is contemplated that the slot 220 could define more or less positions than illustrated. The shift pattern is the path that the lever 202 must follow to go from one shifter position to the other. The lever 202 can follow this path since it is pivotable about the two axes 210 and 216. A spring, not shown, connected between the lower end of the shaft 204 and the cylindrical body 212 biases the lever 202 toward the left of the slot 220, thus facilitating the engagement of the lever in the shifter positions. In FIG. 29, the lever is shown in the neutral (N) position.

The shifter position sensor 192 senses the angular position of the cylindrical body 212 in the housing 214 and sends a shifter position signal representative of this angular position to the VCM 102. Based on this angular position, the VCM 102 can determine in which of the discrete shifter positions the lever 202 is located and uses this information to control the vehicle 10 as indicated below.

When the VCM 102 determines that the lever 202 is in the park (P) position, and that the vehicle 10 is not in movement or at least below a predetermined vehicle speed, the VCM 102 sends a signal to the MCM 100 to stop supplying current to the electric motor 50 in order to interrupt the operation of the electric motor 50. The VCM 102 then sends a signal to the parking brake actuator 142 to engage the parking brake 104. In one embodiment, the VCM 102 waits for a predetermined, non-zero, amount of time from the interrupted operation of the electric motor 50, two seconds for example, prior to sending the signal to engage the parking brake 104.

When the VCM 102 determines that the lever 202 is in the park (P) position, and that the vehicle 10 is in movement above a predetermined vehicle speed the VCM 102 sends a signal to the MCM 100 to stop supplying current to the electric motor 50 in order to interrupt the operation of the electric motor 50. The VCM 102 then sends a signal to the 2WD/4WD selector 130 to disconnect the front shaft 128, and therefore the front driveshaft 162, from the electric motor 50. The VCM 102 then supplies power to the rear axle lock actuator 180 and, if applicable, to the front axle lock actuator 186 such the rear drive axles 156 are disconnected from each other and, if applicable, the front drive axles 172 are disconnected from each other. The electric motor 102 is then controlled to apply a high amount of motor braking as described above. In one example, the high amount of motor braking corresponds to the first amount of motor braking described above when the accelerator pedal 20 is completely released and the shifter is in the high (H) position. This causes the vehicle 10 to decelerate. Once the vehicle 10 is below a first predetermined speed, the VCM 102 sends a signal to the parking brake actuator 142 to engage the parking brake 104, thus causing further deceleration. Once the vehicle 10 is below a second predetermined speed that is lower than the first predetermined speed, the VCM 102 then stops supplying power to the rear axle lock actuator 180 and, if applicable, to the front axle lock actuator 186 such the rear drive axles 156 are connected to each other and, if applicable, the front drive axles 172 are connected to each other. Throughout the above steps associated with putting the shifter in the park (P) position while the vehicle 10 is in movement, signals from the pedal position sensor 28 are ignored by the VCM 102.

When the VCM 102 determines that the lever 202 is in any position other than the park position, the VCM 102 then sends a signal to the parking brake actuator 142 to disengage the parking brake 104.

When the VCM 102 determines that the lever 202 is in the reverse (R) position, the VCM 102 sends a signal to the MCM 100 to control an operation of the electric motor 50 such that the output shaft 90 turns in a direction that causes the vehicle 10 to move rearward. The signal from the pedal position sensor 28 determines the speed at which the output shaft 90 is to be turned. The position of the switches 132, 182 and 188 determine which of the wheels 14 are driven by the electric motor 50 and if the drive axles 156, 172 rotate together or independently of each other. It is contemplated that the VCM 102 could also stop supplying power to the front axles lock actuator 186 such that the front drive axles 172 are connected together regardless of the position of the front axles lock switch 188. As would be understood, in the RUV 10', the VCM 102 does not control the position of the front axles lock actuator 186 as the RUV 10' is not provided with the actuator 186.

When the VCM 102 determines that the lever 202 is in the neutral (N) position, the VCM 102 sends a signal to the MCM 100 to stop supplying current to the electric motor 50 in order to interrupt the operation of the electric motor 50. The VCM 102 then sends a signal to the 2WD/4WD selector 130 to disconnect the front shaft 128, and therefore the front driveshaft 162, from the electric motor 50. The VCM 102 then supplies power to the rear and front axles lock actuators 180, 186 such the rear drive axles 156 are disconnected from each other and the front drive axles 172 are disconnected from each other. As would be understood, in the RUV 10', the VCM 102 does not control the position of the front axles lock actuator 186 as the RUV 10' is not provided with the actuator 186.

When the VCM 102 determines that the lever 202 is in the high (H) or low (L) position, the VCM 102 sends a signal to the MCM 100 to control an operation of the electric motor 50 such that the output shaft 90 turns in a direction that causes the vehicle 10 to move forward. As would be understood, this direction of rotation is opposite the direction of rotation when the lever 202 is in the reverse position. The VCM 10 also sends a signal to the MCM 100 to control the electric motor 50 in a corresponding one of a high mode and a low mode. The position of the switches 132, 182 and 188 determine which of the wheels 14 are driven by the electric motor 50 and if the drive axles 156, 172 rotate together or independently of each other. It is contemplated that the VCM 102 could also supply power to the front axles lock actuator 186 when the lever 202 is in the high position such that the front drive axles 172 are disconnected from each other regardless of the position of the front axles lock switch 188. As would be understood, in the RUV 10', the VCM 102 does not control the position of the front axles lock actuator 186 as the RUV 10' is not provided with the actuator 186. The signal from the pedal position sensor 28 determines the speed at which the output shaft 90 is to be turned. When the lever 202 is in the high position, the MCM 100 controls the electric motor 50 based on signals from the VCM 102 in a high mode where the speed of the vehicle 10 is limited to a speed V1 and the torque that can be generated by the electric motor 50 is limited to a torque T1, thereby limiting the acceleration of the vehicle 10. When the lever 202 is in the low position, the MCM 100 controls the electric motor 50 based on signals from the VCM 102 in a low mode where the speed of the vehicle 10 is limited to a speed V2, that is less than V1, and the torque that can be generated by the electric motor 50 is limited to a torque T2, that is greater than T1, thereby limiting the acceleration of the vehicle 10. In one example, V1 is the speed of the vehicle 10 resulting from the maximum speed of rotation of the output shaft 90 set by the manufacturer of the vehicle 10 while operating the vehicle 10 on level ground, V2 is about 40 percent of V1, T2 is the maximum torque set by the manufacturer of the vehicle 10, and T1 is about 80 percent of T2.

When the economy mode switch 194 is activated, the VCM 102 commands the MCM 100 to operate the electric motor 50 in a manner that partially overrides the operation corresponding to the high and low positions. In the economy mode with the shifter in the high position, the VCM 102 sends a signal to the MCM 100 to control the electric motor 50 in the high mode described above (i.e. with the torque limited to T1) up to a predetermined vehicle speed V4, and above the speed V4, the VCM 102 sends a signal to the MCM 100 to control the electric motor 50 in an economy mode. In the economy mode, the electric motor 50 has a more effective energy consumption than when the electric motor 50 operates according to the lever 202 being in either one of the high and low positions. In the economy mode, the MCM 100 controls the electric motor 50 based on signals from the VCM 102 such that the speed of the vehicle 10 is limited to a speed V3, that is less than V1 but higher than V2, and the torque that can be generated by the electric motor 50 is limited to a torque T3, that is lower than T1 and T2, thereby limiting the acceleration of the vehicle 10. In one example, V3 is about 60 percent of V1, T3 is about 50 percent of T2, and V4 is about 25 percent of V1. In the economy mode with the shifter in the low position, the VCM 102 sends a signal to the MCM 100 to control the electric motor 50 in the low mode described above (i.e. with the torque limited to T2) up to the speed V4, and above the speed V4, the VCM 102 sends a signal to the MCM 100 to control the electric motor 50 in the economy mode except that the VCM 102 limits the vehicle speed to V2 (i.e. the maximum vehicle speed in the low mode but with the torque limited to T3). It is contemplated an additional discrete shifter position could be defined by the slot 220 where the VCM 102 would send a signal to the MCM 100 to control the electric motor 50 in the economy mode at all available vehicle speeds (i.e. with the torque limited to T3 up to the limit speed V3).

In one embodiment, the above control of the electric motor 50 is done by using multiple control maps, but it is contemplated that a single map could be used. Also, in one embodiment, the VCM 102 includes a proportional-integral-derivative controller (PID controller) to generate the signals to the MCM 100 and control the electric motor 50.

Other factors also limit the speed of the vehicle 10 and the torque generated by the electric motor 50 some of which are described below If the temperature sensor 62 senses that the electric motor continues to generate excessive heat even after the fan 60 has been turned on, if the vehicle 10 is operating in the high mode (i.e. shifter 46 in the high position with the economy mode switch 194 deactivated), then the VCM 102 could send a signal to the MCM 100 to now control the electric motor 50 in the low mode even though the shifter 46 has not moved. If the temperature of the motor 50 exceeds a maximum predetermined temperature, the VCM 102 sends a signal to the MCM 100 to stop supplying current to the electric motor 50 in order to interrupt the operation of the electric motor 50.

In one embodiment, the safety belt 17 is provided with a sensor to determine if the driver has fastened his safety belt 17. If the VCM 102 receives a signal indicative that the safety belt 17 has not been fastened, then the VCM 102 sends signals to the MCM such that the torque provided by the electric motor 50 is only a fraction of the torque that would otherwise be provided. In one example, this fraction decreases, in steps or gradually, as the speed of the vehicle 10 increases up to a predetermined vehicle speed at which no torque will be generated by the electric motor 50 regardless of the position of the accelerator pedal 20. In one example, this vehicle speed is less than the speed V3 of the economy mode. It is also contemplated that the fraction of the torque that is provided could also be based on the position of the shifter 46 and therefore the fraction of the torque that is provided would differ depending on whether the shifter 46 is in the high position or the low position.

If the driver of the vehicle 10 depresses the accelerator pedal 20 and the brake pedal at the same time, the VCM 102 sends a signal to the MCM 100 such that the torque provided by the electric motor 50 is only a fraction of the torque that would otherwise be provided. This fraction is based on the current vehicle speed and it is contemplated that it could change as the speed of the vehicle 10 changes. In one example, if the driver of the vehicle 10 depresses the accelerator pedal 20 and the brake pedal at the same time and the vehicle 10 is operating at less than a predetermined low speed (5 km/h for example), the torque provided by the electric motor 50 is only a fraction (¾ for example) of the torque that would otherwise be provided, and above the predetermined low speed no torque is generated by the electric motor 50 regardless of the position of the accelerator pedal 20.

The RUV 10 has other features and components such as headlights and handles. As it is believed that these features and components would be readily recognized by one of ordinary skill in the art, further explanation and description of these components will not be provided herein.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

What is claimed is:
1. An off-road vehicle comprising:
a frame;
at least one seat mounted on the frame;
an electric motor supported by the frame;
at least one battery electrically connected to the electric motor;

two front wheels and two rear wheels supported by the frame, at least two of the wheels being operatively connected to the electric motor for propelling the vehicle;
a front driveshaft selectively connected to the electric motor to selectively drive the two front wheels;
a rear driveshaft connected to the electric motor to drive the two rear wheels;
a 2WD/4WD selector selectively connecting the front driveshaft to the electric motor;
a steering device being operatively connected to at least two of the wheels for steering the vehicle;
a motor control module electrically connected to the electric motor for controlling an operation of the electric motor;
a vehicle control module electrically connected to the motor control module for controlling an operation of the motor control module;
a shifter movably connected to the frame, the shifter being movable to a plurality of discrete positions, the plurality of discrete positions including a neutral position; and
a shifter position sensor operatively connected to the shifter for sensing a position of the shifter, the shifter position sensor being electrically connected to the vehicle control module for transmitting a shifter position signal indicative of the position of the shifter to the vehicle control module, the vehicle control module being adapted for controlling the operation of the motor control module based at least in part on the shifter position signal,
the vehicle control module being adapted to cause the 2WD/4WD selector to disconnect the front driveshaft from the electric motor when the shifter position signal indicates that the shifter is in the neutral position.

2. The off-road vehicle of claim 1, further comprising:
a cockpit area defined in the frame; and
a roll cage connected to the frame, the roll cage covering at least in part the cockpit area;
wherein the at least one seat includes a driver seat and a passenger seat disposed side-by-side in the cockpit area; and
wherein the shifter is disposed laterally between the driver and passenger seats.

3. The off-road vehicle of claim 1, wherein the plurality of discrete positions includes a park position; and
wherein when the shifter position signal indicates that the shifter is in the park position, the vehicle control module is adapted to control the motor control module to cause the electric motor to stop driving the at least two of the wheels being operatively connected to the electric motor.

4. The off-road vehicle of claim 3, further comprising a parking brake operatively connected to at least one of the electric motor and at least one of the wheels; and
wherein when the shifter position signal indicates that the shifter is in the park position, the vehicle control module is adapted to cause the parking brake to be engaged.

5. The off-road vehicle of claim 4, wherein when the shifter position signal indicates that the shifter is in a position other than the park position, the vehicle control module is adapted to cause the parking brake to be disengaged.

6. The off-road vehicle of claim 1,
wherein when the shifter position signal indicates that the shifter is in the neutral position, the vehicle control module is adapted to control the motor control module to cause the electric motor to stop driving the at least two of the wheels being operatively connected to the electric motor.

7. The off-road vehicle of claim 6, further comprising:
a first front drive axle connected to one of the two front wheels for rotation therewith;
a second front drive axle connected to a remaining one of the two front wheels for rotation therewith; and
a front gear assembly operatively connecting the first and second front drive axles to the electric motor, the front gear assembly selectively connecting the first and second front drive axles together;
wherein when the first and second front drive axles are connected together by the front gear assembly, the first and second front drive axles rotate together;
wherein when the first and second front drive axles are disconnected from each other by the front gear assembly, the first and second front drive axles rotate independently from each other; and
wherein when the shifter position signal indicates that the shifter is in the neutral position, the vehicle control module is adapted to cause the front gear assembly to disconnect the first and second front drive axles from each other.

8. The off-road vehicle of claim 1, wherein the plurality of discrete positions includes at least one forward position;
wherein when the shifter position signal indicates that the shifter is in one of the at least one forward position, the vehicle control module is adapted to control the motor control module to cause the electric motor to turn an output shaft of the electric motor in a first direction; and
wherein turning the output shaft in the first direction causes the vehicle to move forward.

9. The off-road vehicle of claim 8, wherein the at least one forward position includes a high position and a low position;
wherein when the shifter position signal indicates that the shifter is in the high position, the vehicle control module is adapted to control the motor control module to control the electric motor to limit a speed of the vehicle to a first vehicle speed; and
wherein when the shifter position signal indicates that the shifter is in the low position, the vehicle control module is adapted to control the motor control module to control the electric motor to limit the speed of vehicle to a second vehicle speed, the second vehicle speed being less than the first vehicle speed.

10. The off-road vehicle of claim 9, wherein when the shifter position signal indicates that the shifter is in the high position, the vehicle control module is adapted to control the motor control module to control the electric motor to limit a torque of the electric motor to a first torque; and
wherein when the shifter position signal indicates that the shifter is in the low position, the vehicle control module is adapted to control the motor control module to control the electric motor to limit the torque of the electric motor to a second torque, the second torque being greater than the first torque.

11. The off-road vehicle of claim 10, further comprising an economy mode switch electrically connected to the vehicle control module, the economy mode switch selectively engaging an economy mode of operation of the electric motor;
wherein when the vehicle control module receives a signal from the economy mode switch that the economy mode of operation of the electric motor has been engaged and the shifter position signal indicates that the shifter is in the high position, the vehicle control module is adapted to control the motor control module to control the electric motor to limit the speed of the vehicle to a third vehicle speed and to limit the torque of the electric motor to a third torque at least when the vehicle speed is above a fourth vehicle speed, the third vehicle speed being less than the first vehicle speed and greater than the second vehicle speed, the fourth vehicle speed being less than the second vehicle speed; and wherein when the vehicle control module receives a signal from the economy mode switch that the economy mode of operation of the electric motor has been engaged and the shifter position signal indicates that the shifter is in the low position, the vehicle control module is adapted to control the motor control module to control the electric motor to limit the speed of the vehicle to the second vehicle speed and to limit the torque of the electric motor to the third torque at least when the vehicle speed is above the fourth vehicle speed.

12. The off-road vehicle of claim 11, wherein when the vehicle control module receives a signal from the economy mode switch that the economy mode of operation of the electric motor has been engaged, the shifter position signal indicates that the shifter is in the high position, and the speed of the vehicle is less than the fourth vehicle speed, the vehicle control module is adapted to control the motor control module to control the electric motor to limit the torque of the electric motor to the first torque; and wherein when the vehicle control module receives a signal from the economy mode switch that the economy mode of operation of the electric motor has been engaged, the shifter position signal indicates that the shifter is in the low position, and the speed of the vehicle is less than the fourth vehicle speed, the vehicle control module is adapted to control the motor control module to control the electric motor to limit the torque of the electric motor to the second torque.

13. The off-road vehicle of claim 8, wherein the plurality of discrete positions includes a reverse position;

wherein when the shifter position signal indicates that the shifter is in the reverse position, the vehicle control module is adapted to control the motor control module to cause the electric motor to turn the output shaft of the electric motor in a second direction, the second direction being opposite the first direction; and wherein turning the output shaft in the second direction causes the vehicle to move rearward.

14. The off-road vehicle of claim 1, wherein the plurality of discrete positions includes a reverse position; and wherein when the shifter position signal indicates that the shifter is in the reverse position, the vehicle control module is adapted to control the motor control module to cause the electric motor to turn an output shaft of the electric motor in a direction causing the vehicle to move rearward.

15. The off-road vehicle of claim 1, wherein the shifter includes a lever, the lever being pivotable about an axis generally perpendicular to a vertical plane containing a longitudinal centerline of the vehicle.

16. An off-road vehicle comprising:
a frame;
at least one seat mounted on the frame;
an electric motor supported by the frame;
at least one battery electrically connected to the electric motor;
two front wheels and two rear wheels supported by the frame, at least two of the wheels being operatively connected to the electric motor for propelling the vehicle;
a steering device being operatively connected to at least two of the wheels for steering the vehicle;
a motor control module electrically connected to the electric motor for controlling an operation of the electric motor;
a first rear drive axle connected to one of the two rear wheels for rotation therewith;
a second rear drive axle connected to a remaining one of the two rear wheels for rotation therewith;
a rear gear assembly operatively connecting the first and second rear drive axles to the electric motor, the rear gear assembly selectively connecting the first and second rear drive axles together,
the first and second rear drive axles rotating together when the first and second rear drive axles are connected together by the rear gear assembly,
the first and second rear drive axles rotating independently from each other when the first and second rear drive axles are disconnected from each other by the rear gear assembly;
a vehicle control module electrically connected to the motor control module for controlling an operation of the motor control module;
a shifter movably connected to the frame, the shifter being movable to a plurality of discrete positions, the plurality of discrete positions including a neutral position; and
a shifter position sensor operatively connected to the shifter for sensing a position of the shifter, the shifter position sensor being electrically connected to the vehicle control module for transmitting a shifter position signal indicative of the position of the shifter to the vehicle control module, the vehicle control module being adapted for controlling the operation of the motor control module based at least in part on the shifter position signal,
the vehicle control module being adapted to cause the rear gear assembly to disconnect the first and second rear drive axles from each other when the shifter position signal indicates that the shifter is in the neutral position.

* * * * *

UNITED STATES PATENT AND TRADEMARK OFFICE
CERTIFICATE OF CORRECTION

PATENT NO. : 9,731,599 B2
APPLICATION NO. : 14/636519
DATED : August 15, 2017
INVENTOR(S) : Gagnon Page 1 of 1

It is certified that error appears in the above-identified patent and that said Letters Patent is hereby corrected as shown below:

In the Claims

Claim 9, Column 28, Line 45, "speed of vehicle" should read -- speed of the vehicle --

Signed and Sealed this
Sixteenth Day of January, 2018

Joseph Matal
*Performing the Functions and Duties of the
Under Secretary of Commerce for Intellectual Property and
Director of the United States Patent and Trademark Office*